US012637289B2

(12) United States Patent
Gil et al.

(10) Patent No.: US 12,637,289 B2
(45) Date of Patent: May 26, 2026

(54) SYSTEM FOR THE STORAGE AND RETRIEVAL OF PARCELS

(71) Applicant: United Parcel Service of America, Inc., Atlanta, GA (US)

(72) Inventors: Julio Gil, Atlanta, GA (US); Julian Leland Bell, Decatur, GA (US); Youngjun Choi, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 708 days.

(21) Appl. No.: 18/118,884

(22) Filed: Mar. 8, 2023

(65) Prior Publication Data

US 2023/0303328 A1 Sep. 28, 2023

Related U.S. Application Data

(60) Provisional application No. 63/322,884, filed on Mar. 23, 2022.

(51) Int. Cl.
B65G 1/12 (2006.01)
B65G 1/04 (2006.01)
(Continued)

(52) U.S. Cl.
CPC ............. B65G 1/12 (2013.01); B65G 1/0478 (2013.01); B65G 1/10 (2013.01); B65G 1/1371 (2013.01);
(Continued)

(58) Field of Classification Search
USPC .................................................. 414/583, 584
See application file for complete search history.

(56) References Cited

U.S. PATENT DOCUMENTS 8,230,141 B2 * 7/2012 Zimmermann ........... B07C 3/02
209/583
10,179,695 B2 1/2019 Battles et al.
(Continued)

FOREIGN PATENT DOCUMENTS

EP 1268313 B1 8/2004
EP 3508444 B1 7/2020
(Continued)

OTHER PUBLICATIONS

International Search Report and Written Opinion received for PCT Patent Application No. PCT/US2023/015164, mailed on Jun. 28, 2023, 13 pages.

*Primary Examiner* — Mark C Hageman
(74) *Attorney, Agent, or Firm* — Shook, Hardy & Bacon L.L.P.

(57) ABSTRACT

An automatic storage and retrieval system is provided that is usable to sort, store and retrieve parcels for delivery. The system provides a multi-layered rail system allowing a high-density storage system for parcels. In some aspects, the parcels may be sorted between parcel containers in different layers, and in some aspects parcel containers may be transferred between layers, allowing individual parcels to be logically sorted and placed within a parcel container according to a delivery destination. Once at a delivery destination, the system may be used to load an unmanned delivery device, such as a robot, with a parcel container associated with the delivery destination.

27 Claims, 27 Drawing Sheets

(51) Int. Cl.
    *B65G 1/10*          (2006.01)
    *B65G 1/137*         (2006.01)
    *B65G 47/53*         (2006.01)
    *B65G 61/00*         (2006.01)

(52) U.S. Cl.
    CPC ............. *B65G 47/53* (2013.01); *B65G 61/00*
              (2013.01); *B65G 2201/0285* (2013.01)

(56)                References Cited

U.S. PATENT DOCUMENTS

| | | | |
|---|---|---|---|
| 10,273,085 B2 * | 4/2019 | Battles | B65G 63/002 |
| 11,741,422 B2 * | 8/2023 | Gil | G06Q 10/08355 |
| | | | 705/338 |
| 11,787,633 B2 * | 10/2023 | Blotnik | B65G 1/1378 |
| | | | 414/268 |
| 12,321,889 B2 * | 6/2025 | Gil | B65G 47/902 |
| 2020/0130893 A1 * | 4/2020 | Väin | G06Q 10/08 |

FOREIGN PATENT DOCUMENTS

| | | | |
|---|---|---|---|
| JP | 5-294181 A | 11/1993 | |
| WO | 2020/080274 A1 | 4/2020 | |

* cited by examiner

SYSTEM FOR THE STORAGE AND RETRIEVAL OF PARCELS

CROSS-REFERENCE TO RELATED APPLICATIONS AND PRIORITY CLAIM

This non-provisional patent application claims priority to U.S. provisional patent app. No. 63/322,884, filed on Mar. 23, 2022, and titled "A SYSTEM FOR THE STORAGE AND RETRIEVAL OF PARCELS," the contents of which is incorporated herein by reference in the entirety.

BACKGROUND

The delivery of parcels requires the loading and storage of parcels so that they may be transported to a delivery location. The storage and delivery can be accomplished with a delivery vehicle, and in the near future may be accomplished with autonomous delivery vehicles. It is a challenge to efficiently manage the parcels inside the vehicle. Parcel size diversity is a challenge, as is efficiently using the available storage volume of the delivery vehicle. An additional challenge can arise in loading and sorting the parcels for the most efficient delivery, such that possible robotic end delivery is an option. Typical current solutions involve robotic arms with grippers (which may not be able to handle all sized parcels) and tote-based solutions (which suffer volumetric inefficiencies).

SUMMARY

At a high level, aspects described herein relate to a mobile, high-density automatic storage, retrieval and sorting system. The system utilizes a multi-layered rail system to support and move a number of parcel containers within a storage vessel, such as a delivery vehicle. As individual parcels are placed in a parcel container, a series of dividers separate the individual parcels, and the system records the initial position of a respective parcel. Each parcel container has an open top face, and an open bottom face that is covered by moveable panels. Through coordinated movement of the panels, an area below a selected parcel can be exposed on the bottom face, allowing the parcel to exit the container, such as by gravity. Each layer of the multi-layered rail system includes a set of rails that define a parcel container route within the storage vessel. In some aspects, the set of rails maintains the orientation of the parcel container throughout the parcel container route, and is configured to allow two parcel containers to fit side-by-side within the storage vessel, with only minimal clearance between adjacent parcel containers (achieving superior volumetric efficiencies, and avoiding lost space in the corners of the storage vessel). The system also includes a drive system operable to move the parcel containers along the parcel container route. Through coordinated movement of parcel containers in different layers, the system can vertically align a parcel container on one layer with a parcel container in an immediately vertically adjacent layer. As the panels of the parcel container in the upper layer open to expose a portion of the open bottom face, an individual parcel may be transferred to the parcel container in the lower layer, through the open top face of the parcel container. In some aspects, the system also includes a lift that is operable to transfer a parcel container in one layer to another layer in the multi-layered rail system. Utilizing the ability to transfer parcels to parcel containers in different layers, and/or by utilizing the lift to transfer parcel containers between layers of the multi-layered rail system, the system can build specific parcel loads selectively, grouping parcels for a particular delivery location or delivery zone into a parcel container.

The system may be used in any number of delivery environments, such as current delivery vehicles (providing a driver with relevant sorted parcels), or autonomous delivery vehicles, along with delivery robots loaded with the sorted parcels in a parcel container for final deliveries, such as via drones or robots, or as one storage component of a delivery vehicle, or any combination of these aspects. In other aspects, the system may be used to sort parcels outside a delivery vehicle, such as in a building or parcel delivery kiosk. In still other aspects, the system could be incorporated into a towable cart. In any of these aspects, the system may be used to sort parcels at a location, or while in transit, and can be used to receive parcels in addition to parcel delivery.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

The present disclosure provides for an automatic storage and retrieval system usable to sort, store and retrieve parcels for delivery. The system provides a multi-layered rail system allowing a high-density storage system for parcels. In some aspects, the parcels may be sorted between parcel containers in different layers, and in some aspects parcel containers may be transferred between layers, allowing individual parcels to be logically sorted and placed within a parcel container according to a delivery destination. Once at a delivery destination, the system may be used to load an unmanned delivery device, such as a robot, with a parcel container associated with the delivery destination. The parcel container may be full, in some aspects, or may be loaded with only selected parcels.

Having described a high level summary of the technology, example aspects are provided below in further detail with reference to the figures.

Figure 1:
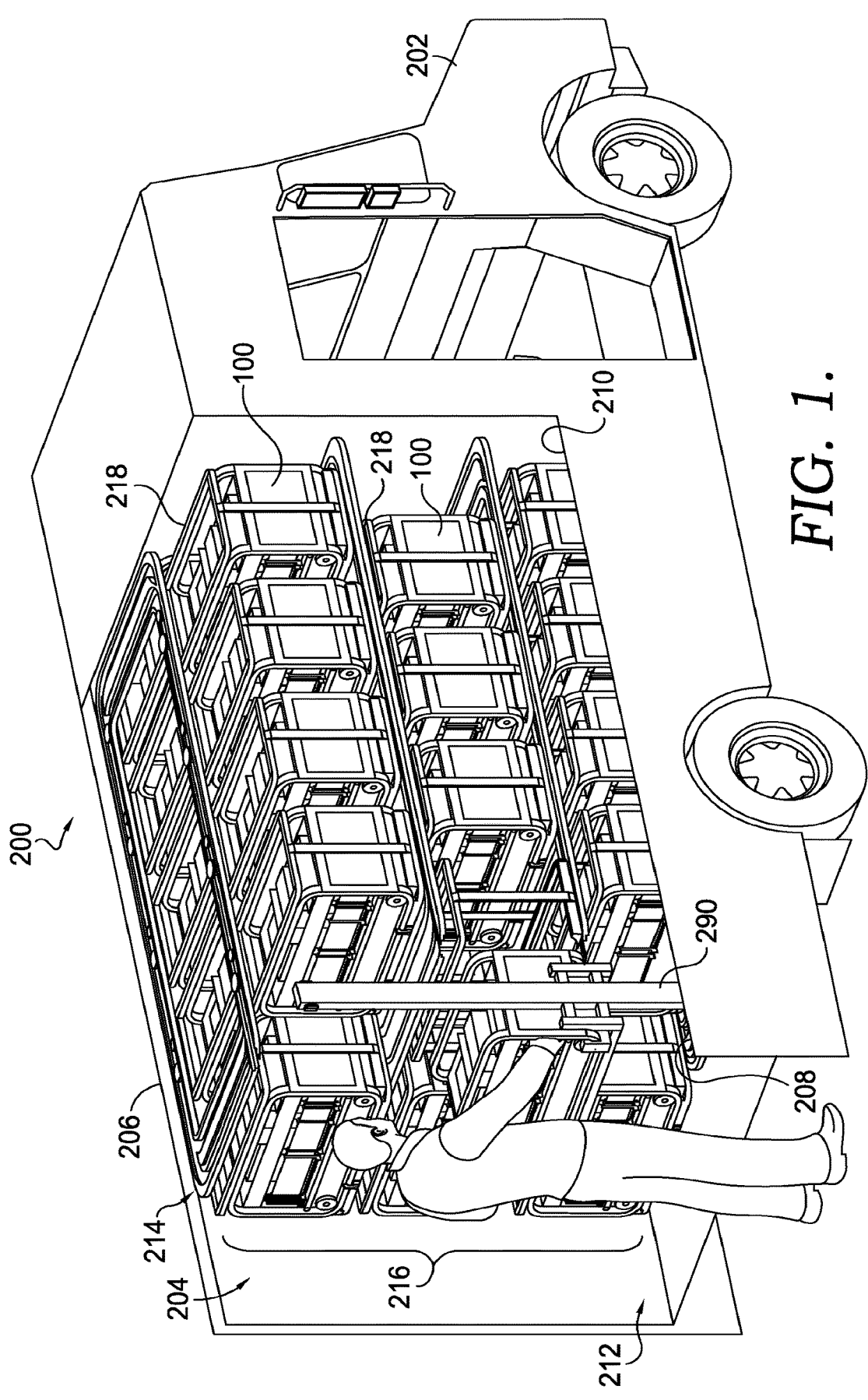
FIG. 1 is a perspective view of a system for the storage and retrieval of parcels, with portions broken away and others shown as transparent, to show details of construction, in accordance with aspects described herein.

FIG. 1 provides a perspective view of a system 200 for the sorting, storage and retrieval of parcels. In some aspects, the system 200 is used in connection with a delivery vehicle 202 that may be either manned or autonomous (unmanned). While the system 200 is shown as part of a delivery vehicle 202, the system 200 may also be used as part of a towable cart, in a customer counter application or other in-building sortation aspects. In certain of the figures, portions of the delivery vehicle 202 are broken away or shown as transparent to reveal internal details of a storage vessel portion 204 of the vehicle 202. In some aspects, the storage vessel 204 includes a first side 206, a second side 208 spaced from the first side 206, a front portion 210 extending from the first side 206 to the second side 208 near the front of the vehicle 202 and a rear portion 212 spaced from the front portion 210 and also extending from the first side 206 to the second side 208. The system 200 in some aspects, includes at least one set of rails 214. As illustrated in FIG. 1, in some aspects, the system 200 includes a multi-layered rail system 216 (shown in FIG. 1 with three layers of rail sets 214). Each rail set 214 supports a plurality of parcel containers 100, which are further described below with respect to FIGS. 2-12. Further, in some aspects, the parcel containers 100 are supported on the set of rails 214 via a container harness 218, which is described in detail below with respect to FIGS. 19-20. The container harness 218 may be an integral part of the parcel container 100 or may be a separate component. FIG. 1 illustrates a person loading a parcel container 100 into a container harness 218 in the middle layer of the multi-layered rail system 216. Each set of rails 214 defines a parcel container route down the first side 206, across the front portion 210, down the second side 208 and across the rear portion 212, while maintaining the same orientation of the parcel container 100 as it travels the parcel container route defined by the set of rails 214. As shown in FIG. 1, the system 200 efficiently uses the available space within the storage vessel 204 of the delivery vehicle 202.

Figure 2:
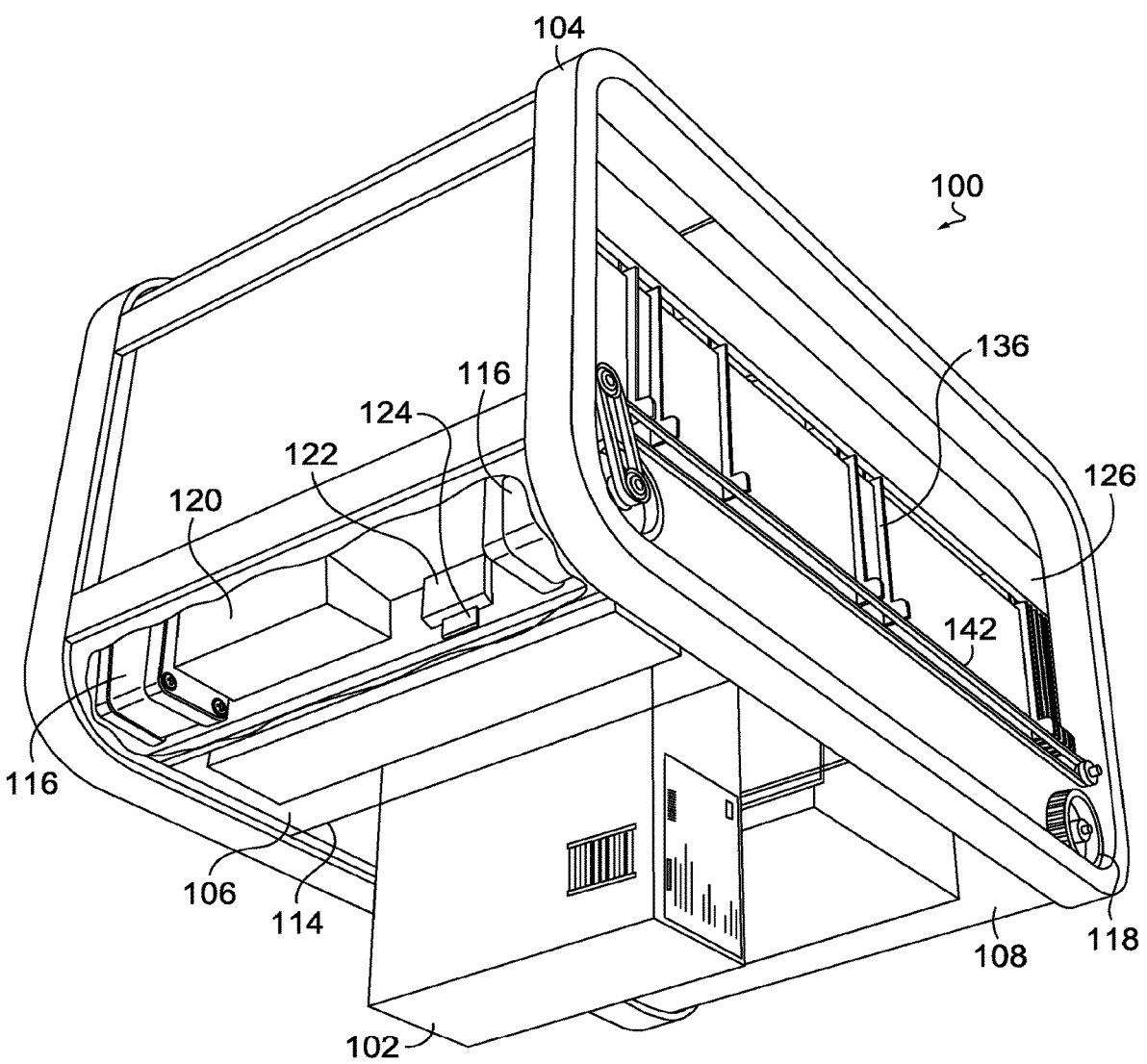
FIG. 2 is a perspective view of a parcel container used within the system of FIG. 1, with portions broken away and others shown as transparent, to show details of construction, in accordance with aspects described herein.
Figure 3:
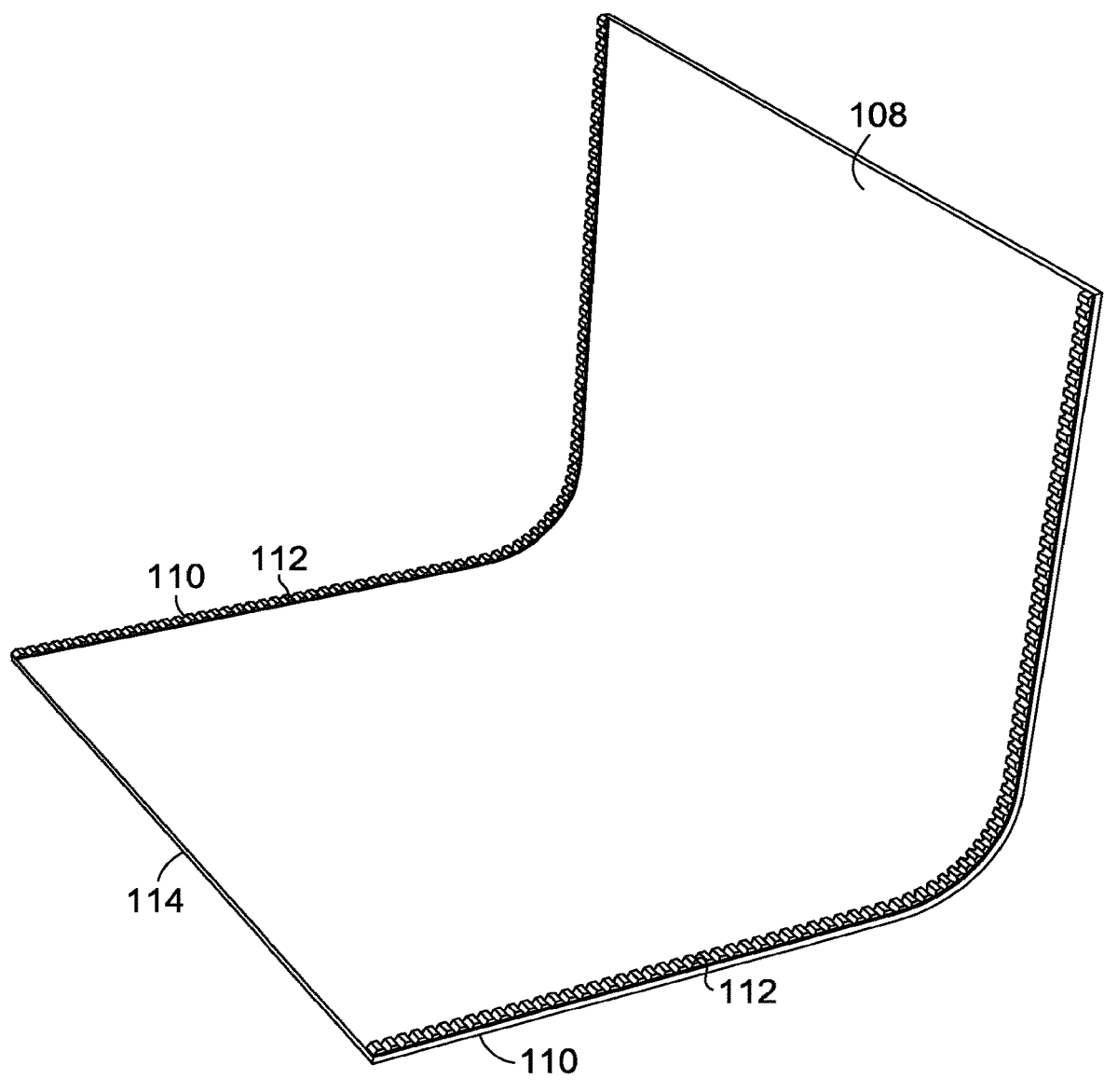
FIG. 3 is a perspective view of a panel, used on the parcel container in accordance with aspects described herein.
Figure 4:
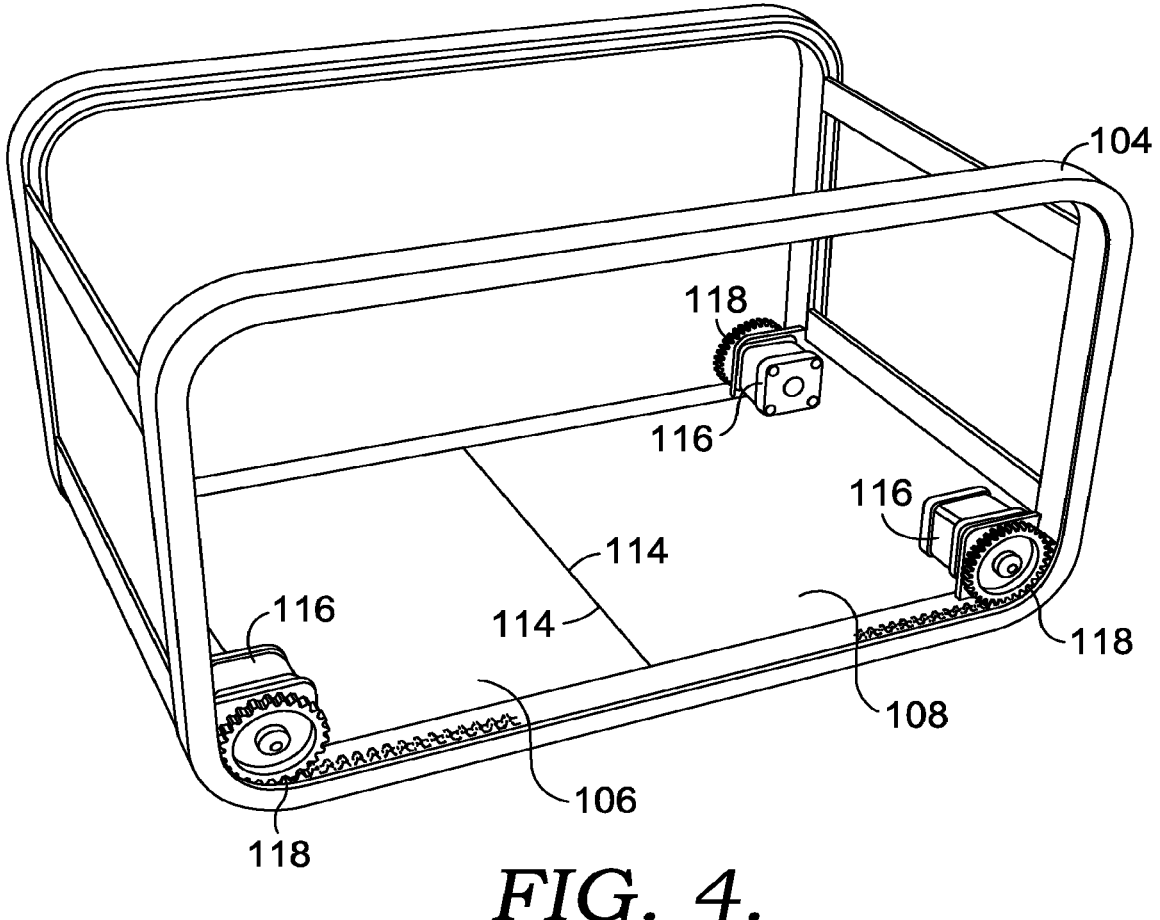
FIG. 4 is a perspective view of selected portions of the parcel container, in accordance with aspects described herein.

Turning initially to the parcel container 100, FIG. 2 provides a perspective view of parcel container 100 that may be used to store and deliver parcels (the parcels being labeled in the figures as 102). As best seen in FIG. 4, in some aspects, the parcel container 100 has a rigid frame 104. The frame 104 is constructed from a sturdy, lightweight material. In some aspects, the frame 104 has at least one open face, and in some aspects, the parcel container 100 is oriented such that the open face is the bottom, allowing for gravity-assisted delivery or transfer of the parcel 102. The frame 104 supports a first panel 106 and a second panel 108. In FIG. 2, portions of the first panel 106 are broken away, and portions of the first panel 106 and the second panel 108 are shown as transparent to reveal other components. In some aspects, the first panel 106 and the second panel 108 are mirror-images of one another. The second panel 108 is shown in isolation in FIG. 3. In some aspects, the first panel 106 and the second panel 108 are constructed of a flexible, but strong plastic sheeting material. In other aspects, a plastic tambour sliding panel may be used for the first panel 106 and the second panel 108. Other materials, including non-plastic materials, could also be used for the first panel 106 and the second panel 108. The following discussion of the second panel 108 applies equally to the first panel 106, but will not be repeated for the sake of brevity. As shown in FIG. 3, the second panel 108 is flexible, or articulated, allowing it to bend. In some aspects, the second panel 108 includes outer edges 110 that include a series of teeth, constructed as a gear rack 112. In other aspects, the outer edges 110 include a series of holes (socket holes), to interact with a gear as further described below. In this aspect, the socket holes may be reinforced (such as with thin strips of spring steel, as an example) to increase the ability of the first panel 106 and/or the second panel 108 to transmit compressive loads. As best seen in FIG. 3, the second panel 108 has a terminal end 114. In a first position, the first panel 106 and the second panel 108 may be positioned to completely cover the open bottom face of the frame 104, as shown in FIG. 4. In this first position, the terminal end 114 of the first panel 106 abuts the terminal end 114 of the second panel 108. In some aspects, the terminal end 114 of the first panel 106 mates with the terminal end 114 of the second panel 108. In this aspect, one terminal end 114 on one of first panel 106 or second panel 108 may have a male protrusion that mates with a terminal end 114 of the opposite panel having a mating female shape. In some aspects, the first panel 106 and the second panel 108 have a length that is equal to or greater than the length of the open bottom face of the frame 104, such that either the first panel 106 or the second panel 108 could substantially cover the entire open face of the frame 104. The first panel 106 and the second panel 108 are slidingly coupled to the frame 104, and in some aspects, the frame 104 may have a track therein that accepts the first panel 106 and the second panel 108. In other aspects, the first panel 106 and/or the second panel 108 may be rolled into a cylinder and housed within a cylindrical enclosure at either end of the frame 104. In some aspects, the terminal end 114 of the first panel 106 may be coupled to the opposite end of the first panel 106, and/or the terminal end 114 of the second panel 108 may be coupled to the opposite end of second panel 108, such as with a tensioned cable, string, belt or other tensile member. In this aspect, the first panel 106 and the second panel 108 form a continuous closed loop around the outside perimeter of the parcel container 100, and are driven like a normal tensile belt, rather than requiring the first panel 106 and the second panel 108 to withstand compressive forces as the first panel 106 and the second panel 108 are driven.

As shown in FIG. 4, in some aspects, a pair of motors 116 are coupled to each end of the frame 104 and have a gear 118 that mates with the rack 112 in the first panel 106 or the second panel 108. While two motors 116 are shown on each end of the frame 104, it is contemplated that only one motor 116 may be utilized on each end of the frame 104 (in some aspects this could be accomplished with a connecting shaft to join gears 118 on opposite sides of the frame 104). As the motor 116 rotates the gear 118, the first panel 106 or the second panel 108 are moved relative to the frame 104, following the contour of the frame 104. In some aspects, as further described below, the motors 116 cooperatively move the first panel 106 and the second panel 108 to expose a desired area below only the parcel 102 that is desired to be delivered or dispensed. In some aspects, the parcel container 100 may also include a mechanism to assist the parcel 102 as it exits the parcel container 100, beyond gravity. In some aspects, this mechanism may operate to exert a pushing force on the parcel 102, such as, for example, a belt, or segmented belt, a linear actuator, or a pneumatic device. While other motors may be used, in some aspects, motors 116 are stepper motors. While the motors 116 are shown as internal to the frame 104, in other aspects, the motors 116 and the gears 118 may be external to the frame 104. In some aspects, a drive motor (such as motor 116) may not engage the first panel 106 and/or the second panel 108 directly. In this aspect, the drive motor may drive a tensile member that couples the ends of the first panel 106 together, and/or the ends of the second panel 108 together.

As best seen in FIG. 2, the motors 116 may be powered by a battery 120 coupled to the frame 104. The battery 120 may be any of a number of batteries, and in some aspects is a rechargeable battery. The battery 120 may also be external to the parcel container 100 itself that may have an electrical connector for a power supply. With continued reference to FIG. 2, the parcel container 100 may also have an on-board central processing unit (CPU) and a memory card 124 to store information and carry out the logic associated with the parcel container 100. The parcel container 100 may also have wireless or wired communications to transmit and receive content, divider information (such as divider 136 described below) and actions to perform. In general, the memory 124 stores computer-usable information, such as data or instructions. One example of memory 124 is described in FIG. 29 with reference to memory 2912. While memory 124 is depicted as a single data store, memory 124 may include one or more data stores or may be in a cloud environment.

Figure 5:
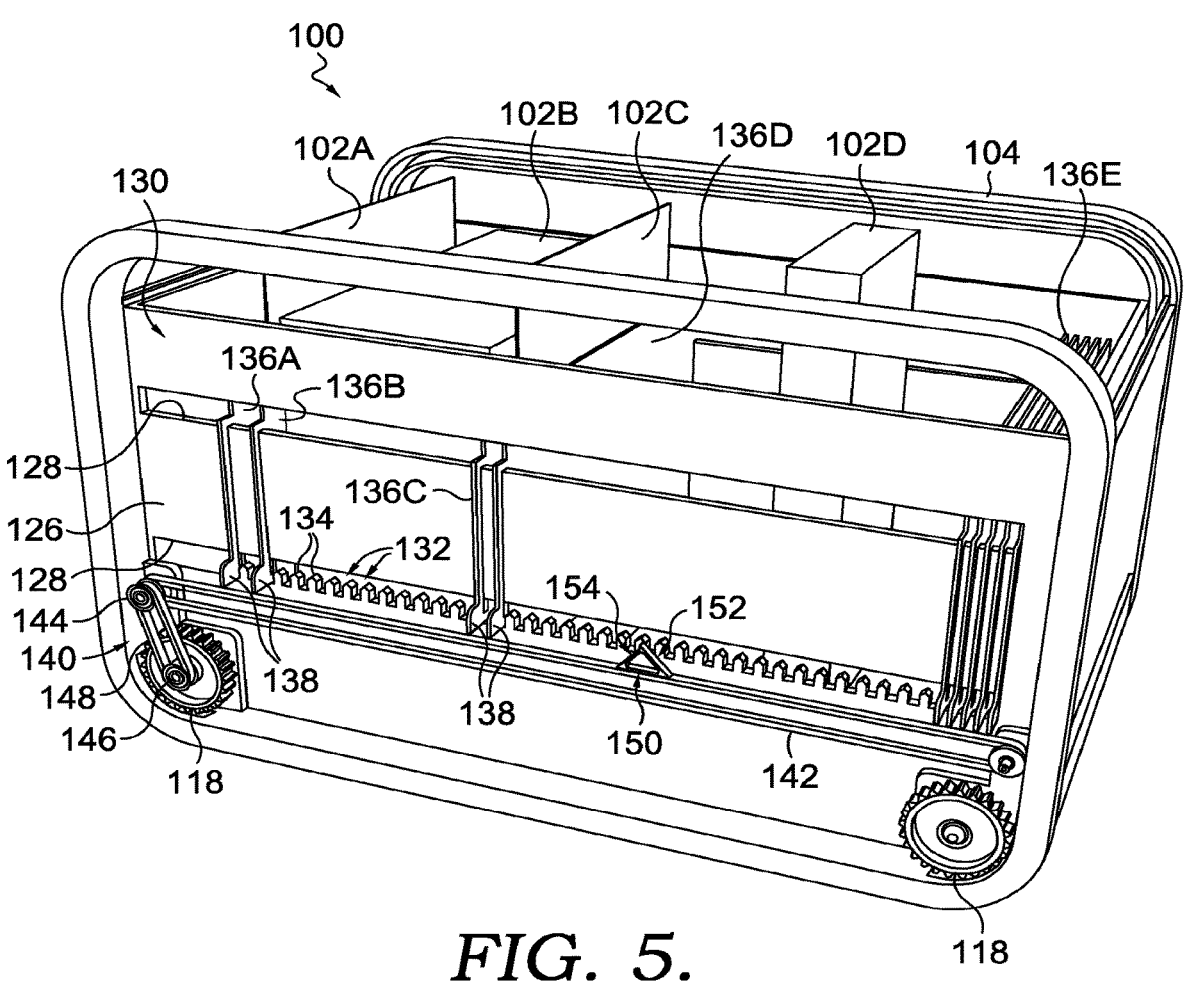
FIG. 5 is a perspective view of the parcel container of FIG. 2, in accordance with aspects described herein.
Figure 6:
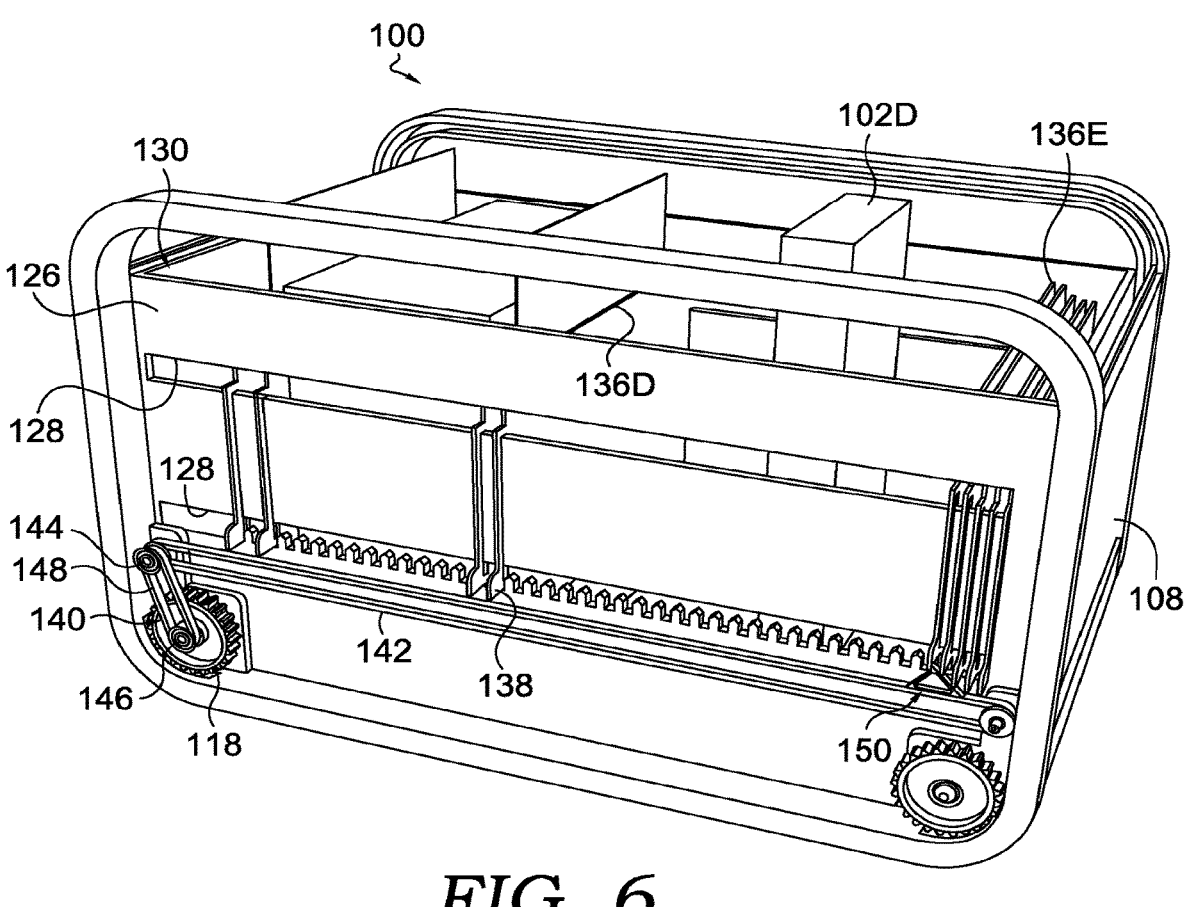
FIG. 6 is a view similar to FIG. 5, showing aspects of a divider movement mechanism of the parcel container, in accordance with aspects described herein.
Figure 7:
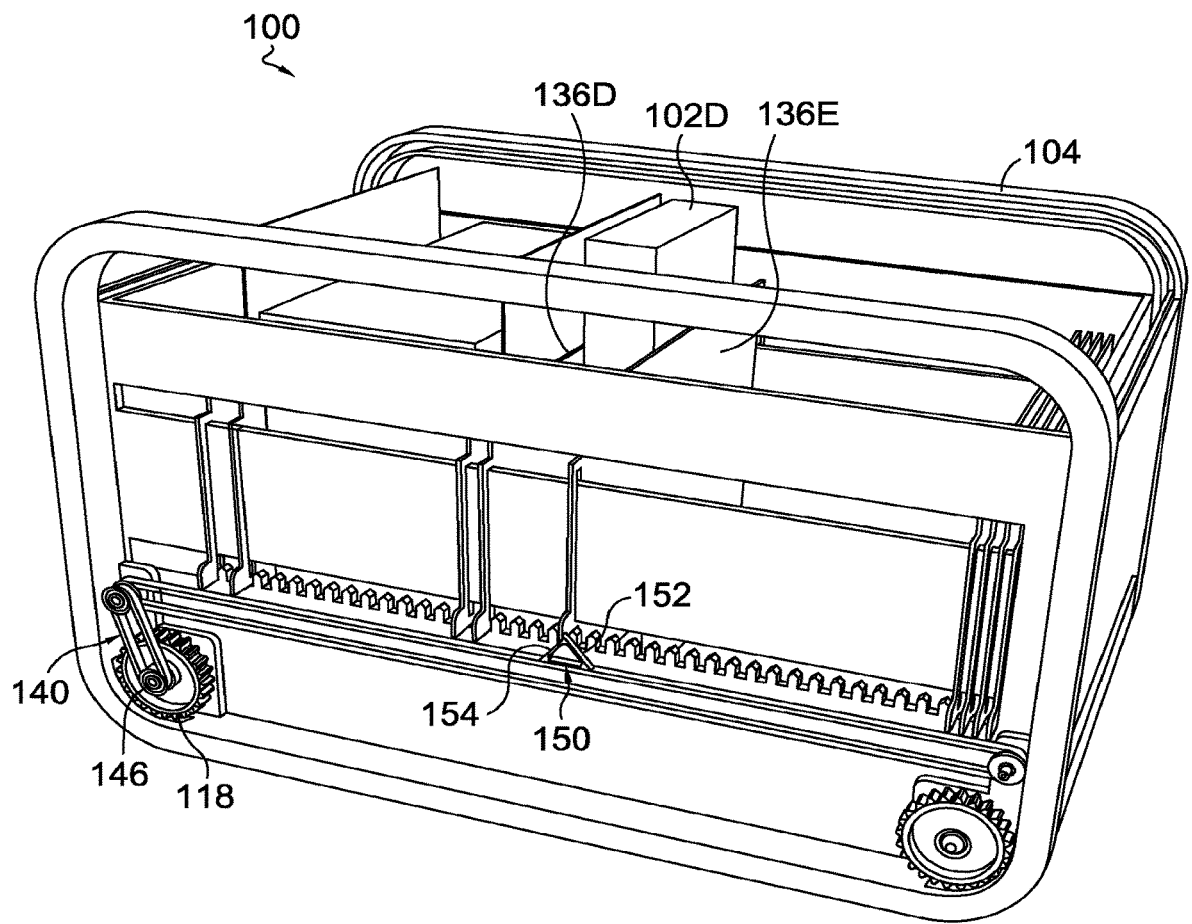
FIG. 7 is a view similar to FIG. 6, showing a different stage of the divider movement mechanism.

As best seen in FIG. 5, the parcel container 100 may have sides 126 having spaced lateral grooves 128 therealong. In some aspects, each side 126 has an upper groove 128 and a lower groove 128 below the upper groove. In some aspects, the sides 126 are part of a removable tote 130 that fits within the frame 104 of the parcel container 100. The sides 126 may also have a series of slots 132 formed by spaced protrusions 134. In some aspects, the slots 132 are formed in the lower groove 128.

With continued reference to FIG. 5, the parcel container 100 has a series of dividers 136 that are supported by, and slide along, the upper and lower grooves 128. The dividers 136 are positioned along the sides 126 to create compartments of varying sizes based upon the parcels 102 contained therein. As an example, parcel 102A in FIG. 5 may be thin, such as an envelope. A first divider 136A is spaced a short distance from an adjacent divider 136B to create a narrow compartment in the parcel container 100 that approximates the size of the parcel 102A. In a similar fashion, a larger parcel 102B may be accommodated and located between the divider 136B and a divider 136C. Once in a desired location along the sides 126, the dividers 136, in some aspects, are held in the desired location by a tab 138 on the divider 136 that drops into a corresponding slot 132 at the desired location. As shown in FIG. 5, the parcel container 100 may store any dividers 136 that are not used in creating compartments at one end of the parcel container 100.

With initial reference to FIG. 5, the parcel container 100 may also have a divider movement mechanism 140. In some aspects, the divider movement mechanism has a drive belt 142 that extends along the length of at least one side 126. In some aspects, the drive belt 142 is driven by a pulley or gear 144 that is, in turn, driven by one of the motors 116. In some aspects, a common shaft of the motor 116 selectively drives either the gear 118, or a gear 146. When driven by the motor 116, the gear 146 is coupled through a chain or belt 148 to gear 144. In some aspects, the selective drive of either gear 118 or gear 146 utilizes a concentric axle that is driven by motor 116. In other aspects, a separate motor may be used to move drive belt 142. In still other aspects, a solenoid clutch may be used to selectively drive either gear 118 or gear 146.

In some aspects, a divider engagement device 150 is coupled to the drive belt 142 and protrudes upwardly therefrom. The divider engagement device 150, in some aspects, has a triangular shape including a first surface 152 that operates as a cam surface to select the next available divider 136 from the stored dividers 136 at one end of the parcel container 100. In FIG. 5, the next available divider 136 is labeled 136E. As can be seen by comparing FIG. 5 to FIG. 6, the divider engagement device 150 is moved, as belt 142 moves, such that the first surface 152 engages the tab 138 on divider 136E. As the tab 138 contacts the first surface 152, the divider 136E is lifted above the protrusions 134, allowing the divider 136E to move freely along the side 126 of the parcel container 100. In some aspects, the divider engagement device 150 has a catch surface 154 (the leg of the triangle adjacent first surface 152 in this aspect). The catch surface 154 contacts the tab 138 on the divider 136E. At this point, the direction of the drive belt 142 can be reversed, and the divider engagement device 150 moves the divider 136E away from the end of the parcel container 100. As described further below, the divider 136E is moved against a parcel (labeled 102D in FIGS. 6 and 7) that has been placed within the parcel container 100. As the divider 136E moves further, the parcel 102D moves as well, until the parcel 102D contacts the divider labeled 136D, effectively "sandwiching" the parcel 102D between divider 136D and divider 136E.

Figure 8:
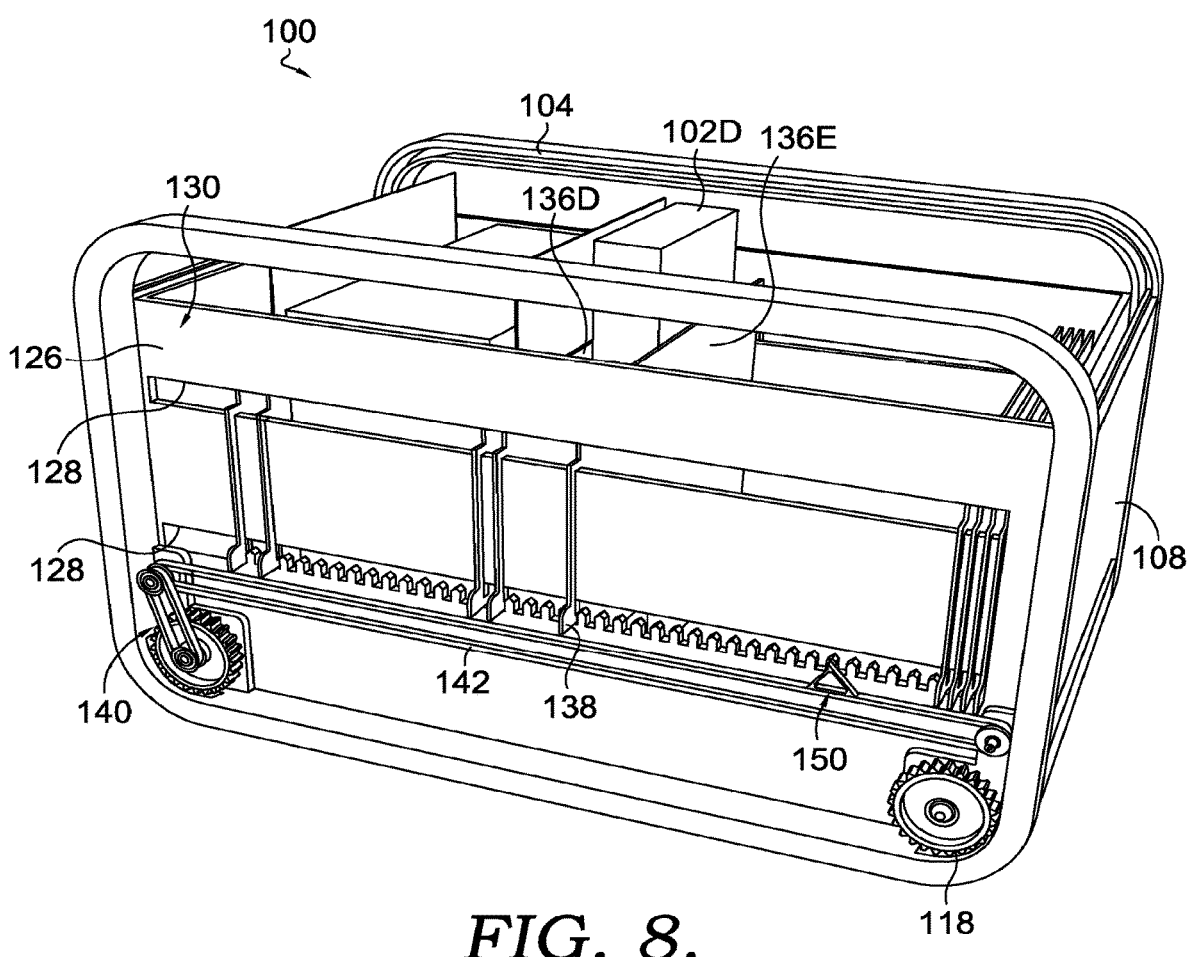
FIG. 8 is a view similar to FIG. 7, showing yet another stage of the divider movement mechanism, in accordance with embodiments described herein.
Figure 9:
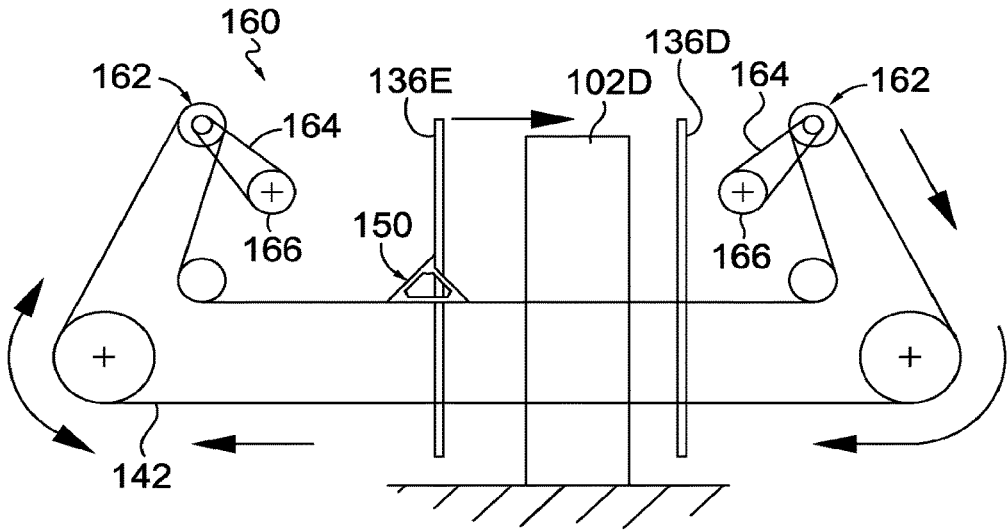
FIG. 9 illustrates a divider position sensing system with a representative divider in a first position, in accordance with embodiments described herein.
Figure 10:
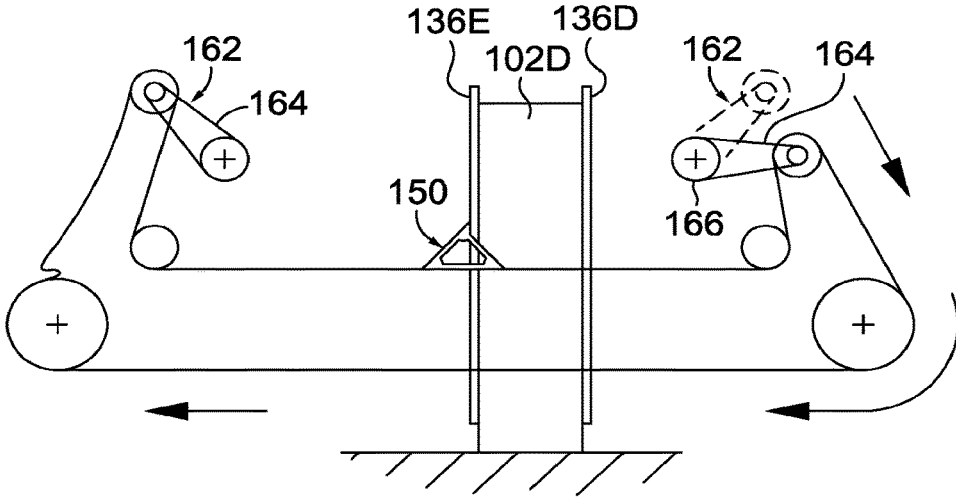
FIG. 10 is a view similar to FIG. 9, with the representative divider in a second position against a parcel.

In some aspects, the parcel container 100 has a position sensing system that determines the position of the dividers 136. One aspect of a position sensing system 160 is shown, somewhat schematically, in FIGS. 9 and 10. As shown in FIG. 9 (from the side of the parcel container 100 opposite that shown in FIGS. 2-8), in some aspects the drive belt 142 includes at least one belt tensioner 162 that has a tensioner arm 164. As shown in FIG. 9, in some aspects, two belt tensioners 162 are coupled to the drive belt 142. The tensioner arms 164 are spring-loaded to apply tension to the drive belt 142, and are mounted on rotary pivots 166. The rotary pivots 166 have an associated rotary encoder that detects and records motion in the rotary pivots 166. As tension in the drive belt 142 increases, deflections in the tension arms 164 will register in the rotary encoders. As the divider (labeled 136E) is moved by the divider engagement device 150 against the parcel 102D, a relatively small amount of force is encountered by the divider 136E, and will register as a relatively small deflection of the tension arms 164. When the parcel 102D is moved by divider 136E and the divider engagement device 150 against divider 136D, the tension in drive belt 142 will register as an increased force in the rotary encoders as the tension arm 164 deflects, as shown in FIG. 10 (note that FIG. 10 shows the left tension arm 164 in the same position for illustrative purposes to illustrate the reduced tension in the drive belt 142, and in some aspects, the left tension arm 164 will react to remove the "slack"). In this aspect, the parcel container 100 registers the parcel 102D as fully within a compartment when the increased force discussed above with respect to FIG. 10 is encountered. When this increased force on the tension arm 164 is registered in the rotary encoder, the direction of the drive belt 142 may be again reversed, releasing the divider 136E from the divider engagement device 150 (as shown in FIG. 8). As the divider engagement device 150 moves away from the divider 136E, tension arm 164 returns to the position shown in FIG. 9, and the divider 136E lowers into a corresponding slot 132 to lock the divider 136E in place. The location of the divider 136E may be registered as that location when the rotary encoder registered the increased force on tension arm 164, and may be stored in memory 124.

Figure 11:
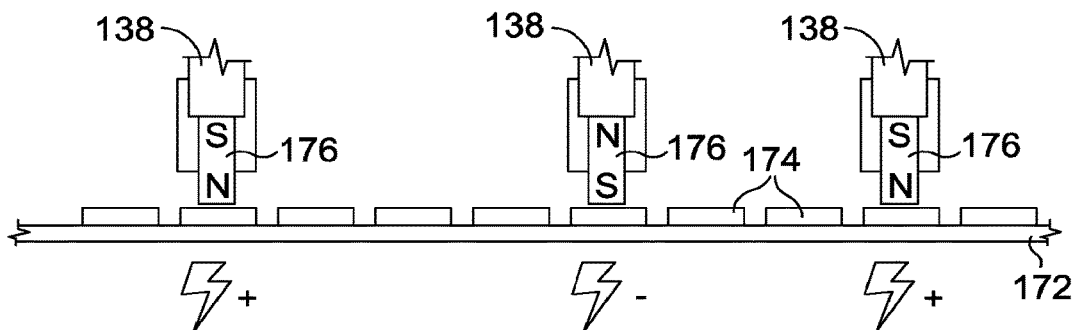
FIG. 11 schematically illustrates a portion of another divider position sensing system, in accordance with embodiments described herein.
Figure 12:
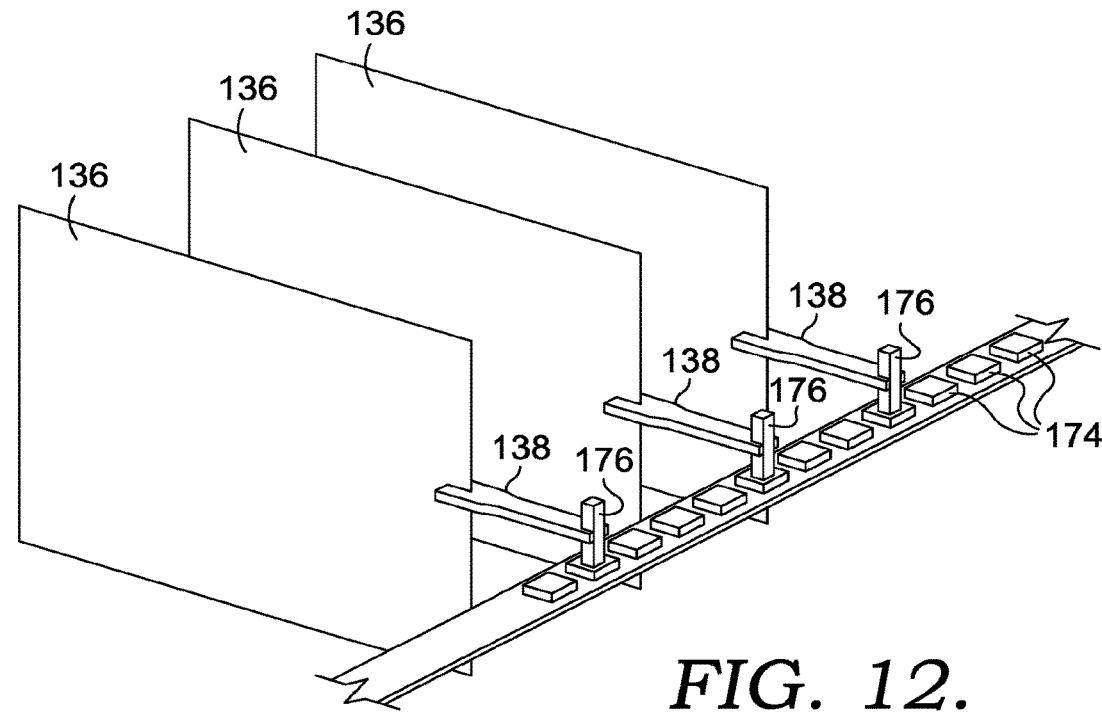
FIG. 12 illustrates the divider position sensing system of FIG. 11, in the parcel container environment, in accordance with embodiments described herein.

In other aspects, a position sensing system 170 is shown in FIGS. 11 and 12. As shown in FIG. 11, the position sensing system 170 includes a printed circuit board (PCB) 172 used as a linear position sensor of the dividers 136. In some aspects, the PCB 172 is flexible and can follow a non-linear path. The position sensing system 170 also includes Hall effect sensors 174 arranged in a linear, multiplexed array. Each divider 136 includes a magnet 176 mounted a distance above the array of Hall effect sensors 174 (such as, for example, between 1 and 5 mm). In some aspects, the magnets 176 may be mounted to the tabs 138 on dividers 136 and are shown somewhat schematically in FIGS. 11 and 12. In some aspects, adjacent dividers 136 have magnets 176 with an opposite polarity. In this aspect, the dividers 136 are arranged with magnets 176 having alternating polarity (N,S,N,S and so on). As the divider 136 moves the magnet 176 along the array of Hall effect sensors 174, sequential Hall effect sensors 174 latch and unlatch, indicating the position of the magnet 176 along the array. Since Hall effect sensors 174 detect not only the position, but also the polarity of a magnet 176, the position sensing system 170 may be used to distinguish between dividers with N or S polarity. In some aspects, a specialized integrated circuit could be fabricated that integrates the Hall effect sensors 174 and measurement electronics in a single package, such as a rigid chip or a flexible tape. As the position sensing system 170 determines the position of a respective divider 136, the position may be stored in memory 124.

Figure 13:
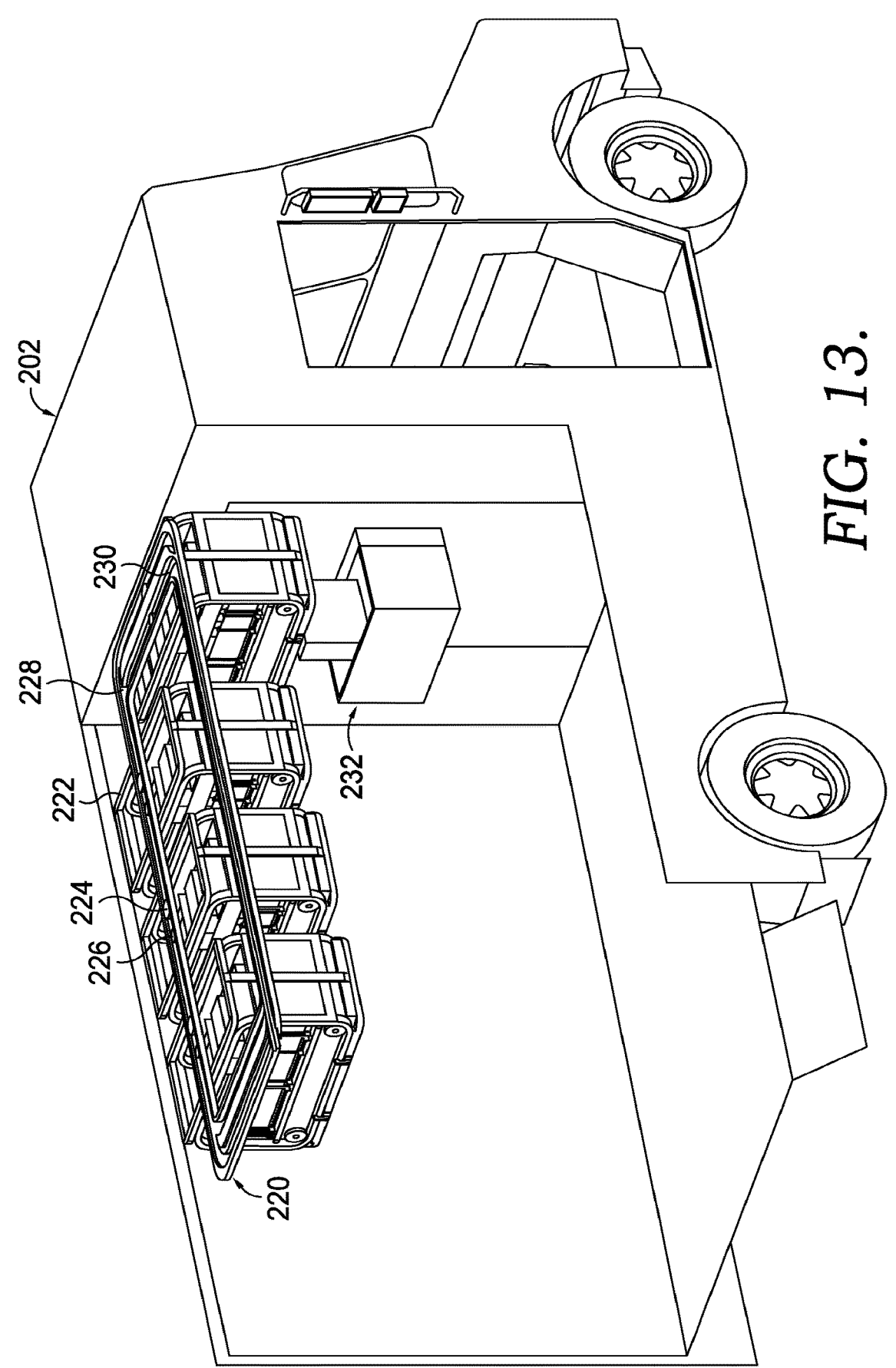
FIG. 13 illustrates a perspective view of an aspect of the system of FIG. 1, but showing an alternative construction with only one rail.

FIG. 13 illustrates parcel containers 100 supported on a rail 220 within the storage vessel 204, and routing the parcel containers 100 near the front portion 210 of the storage vessel 204. Each parcel container 100 is supported on a container harness 222. In some aspects, the container harness 222 differs slightly from the container harness 218 of FIG. 1. In some aspects, the container harness 222 includes a first upper pin 224 and a second upper pin 226. The first upper pin 224 and the second upper pin 226 are aligned with one another in a plane extending from the front portion 210 to the rear portion 212. As shown in FIG. 13, the first upper pin 224 follows a first track 228 formed within rail 220, while the second upper pin 226 follows a second track 230 formed within the rail 220. The first track 228 is vertically aligned with the second track 230 along the sections running in a direction between the front portion 210 and the rear portion 212, and the first track 228 is vertically offset and spaced from the second track 230 along the sections of the track running in a direction between the first side 206 and the second side 208. In some aspects, the first upper pin 224 has a larger diameter than the second upper pin 226, allowing the first upper pin 224 to ride in the first track 228 above the second upper pin 226 in the second track 230 when the first track 228 is vertically aligned with the second track 230. This arrangement of the first upper pin 224 and the second upper pin 226, along with the arrangement of the first track 228 and the second track 230 routes each parcel container 100 within the storage vessel 204 and maintains the same orientation of the parcel container 100 within the storage vessel 204. In some aspects, the front portion 210 may contain a tray 232 located below the bottom of the parcel containers 100 on rail 220. At or near a delivery location, a parcel container 100 may be positioned over the tray 232, and a selected parcel 102 may be released from the parcel container 100 into the tray 232 by opening the first panel 106 and the second panel 108. The tray 232 may include an opening from the storage vessel 204, allowing convenient driver access to the parcel within the tray 232.

Figure 14:
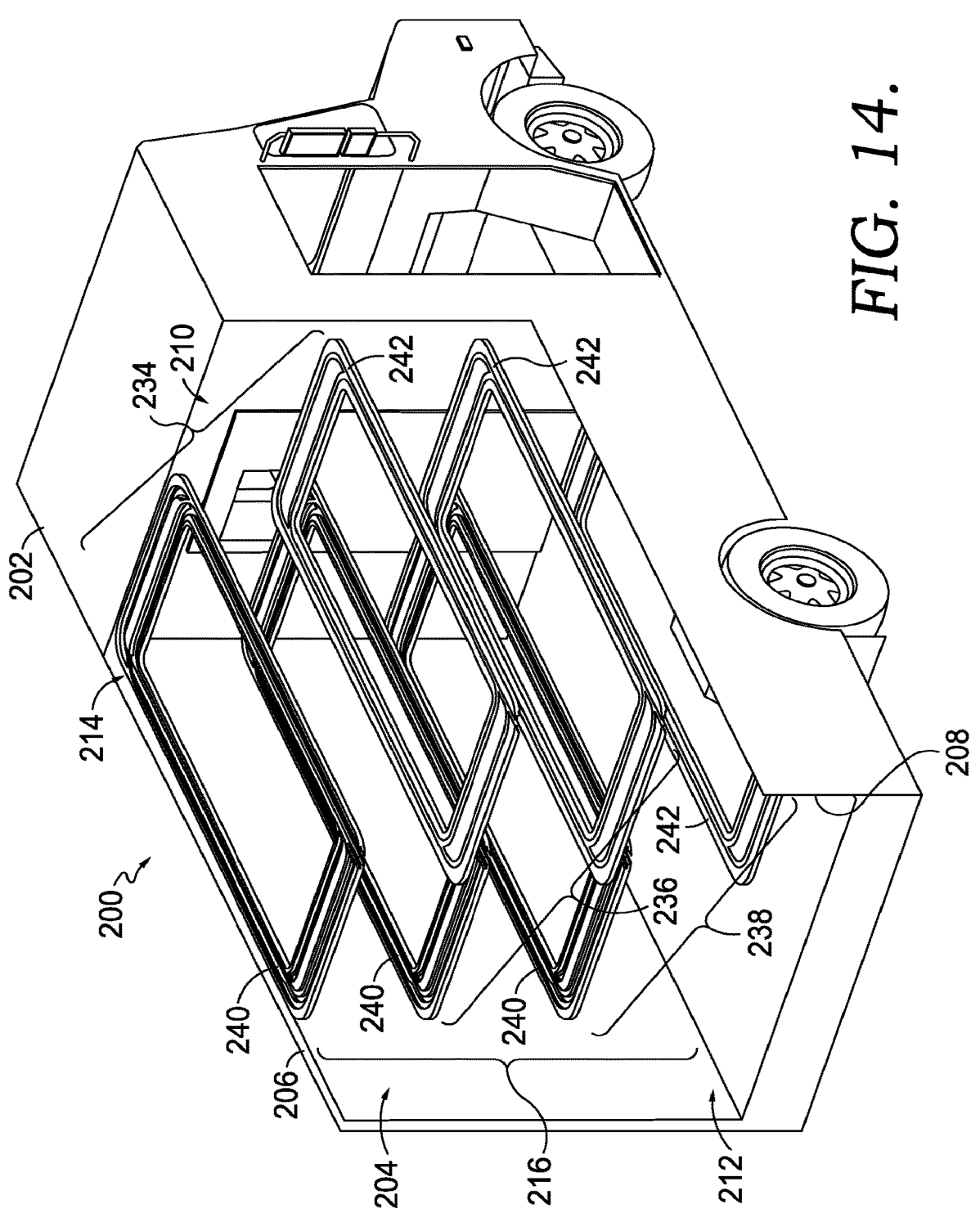
FIG. 14 illustrates the system of FIG. 1, showing the multi-layered rail system without parcel containers.
Figure 16:
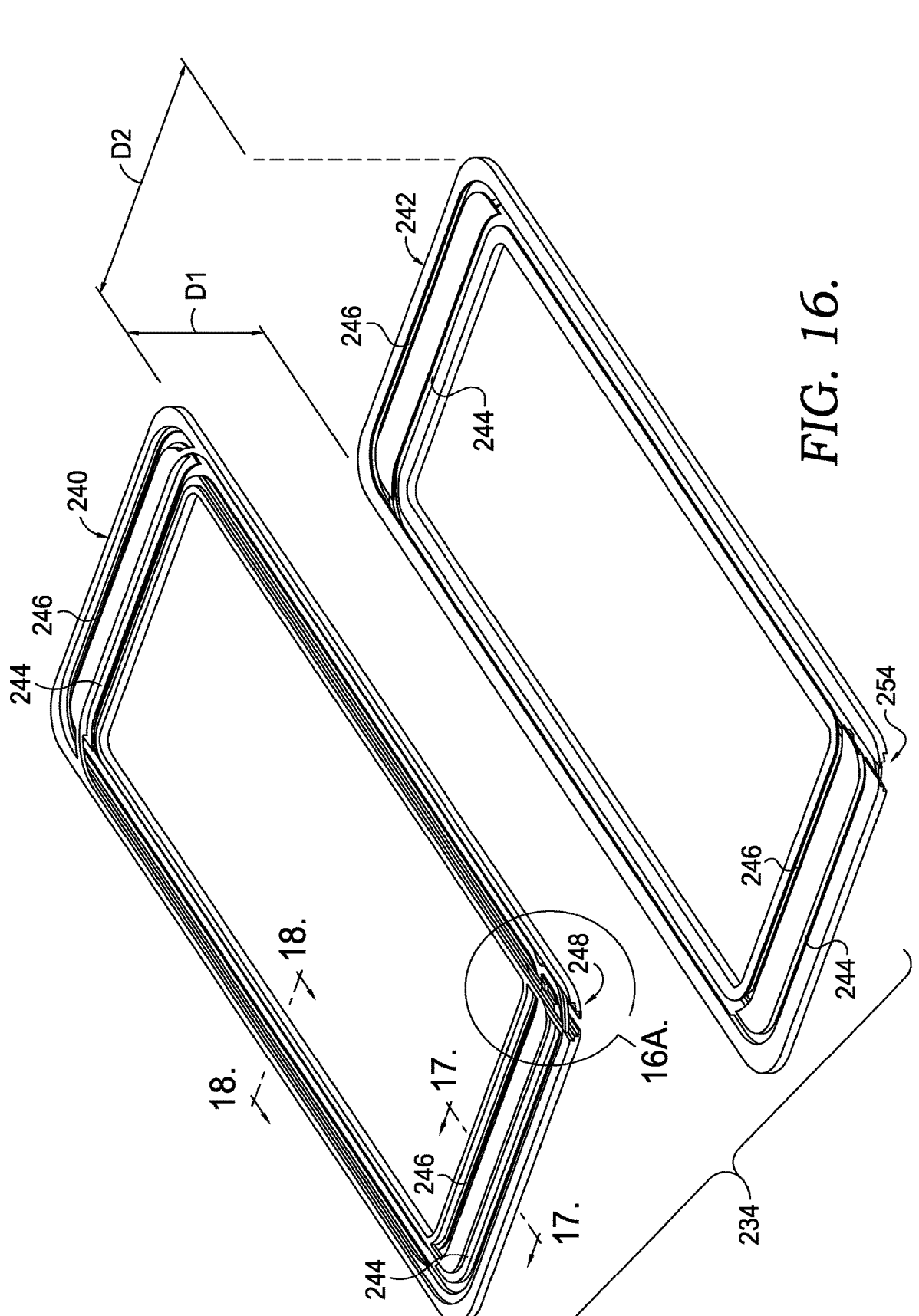
FIG. 16 illustrates a perspective view of one layer of the multi-layered rail system in isolation.
Figures 17, 18:
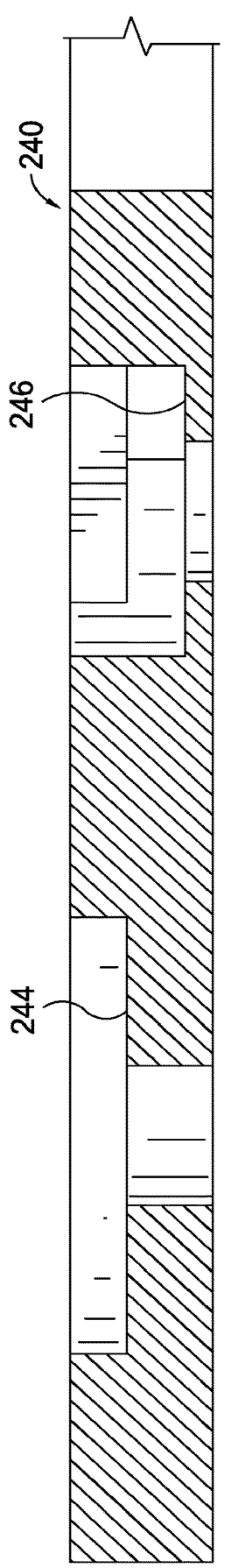
FIG. 17 illustrates a cross-section of one rail taken along line 17-17 of FIG. 16.
FIG. 18 illustrates a cross-section of one rail taken along line 18-18 of FIG. 16.

While FIG. 13 illustrates only one rail 220, in some aspects, as shown in FIG. 14, the system 200 includes a multi-layered rail system 216, where each layer includes a set of rails 214. More specifically, the multi-layered rail system 216 may include a first set of rails 234, a second set of rails 236 and a third set of rails 238. Each of the first set of rails 234, the second set of rails 236 and the third set of rails 238 has a first rail frame 240 and a second rail frame 242. (In some aspects, additional rail frames could be included, allowing configurations of three or more containers 100 across the width of the storage vessel 204). As shown in FIG. 14, each of the first rail frames 240 is in vertical alignment, and each of the second rail frames 242 is in vertical alignment (such that each of the first set of rails 234, the second set of rails 236 and the third set of rails 238 are in vertical alignment with one another). As seen in FIG. 16, within each set of rails, the first rail frame 240 is vertically offset from the second rail frame 242 by a first distance (D1), and the first rail frame 240 is horizontally offset from the second rail frame 242 by a second distance (D2). As best seen in FIGS. 16-18, the first rail frame 240 includes a first track 244 and a second track 246. The first track 244 is offset from the second track 246 on the ends of the first rail frame 240 that run in a direction from the first side 206 to the second side 208 of the storage vessel, as best seen in the cross-section view of FIG. 17. On the sides of the first rail frame 240 that run in a direction from the front portion 210 to the rear portion 212, the first track 244 is vertically aligned with the second track 246, as best seen in the cross-section view of FIG. 18.

Figure 16A:
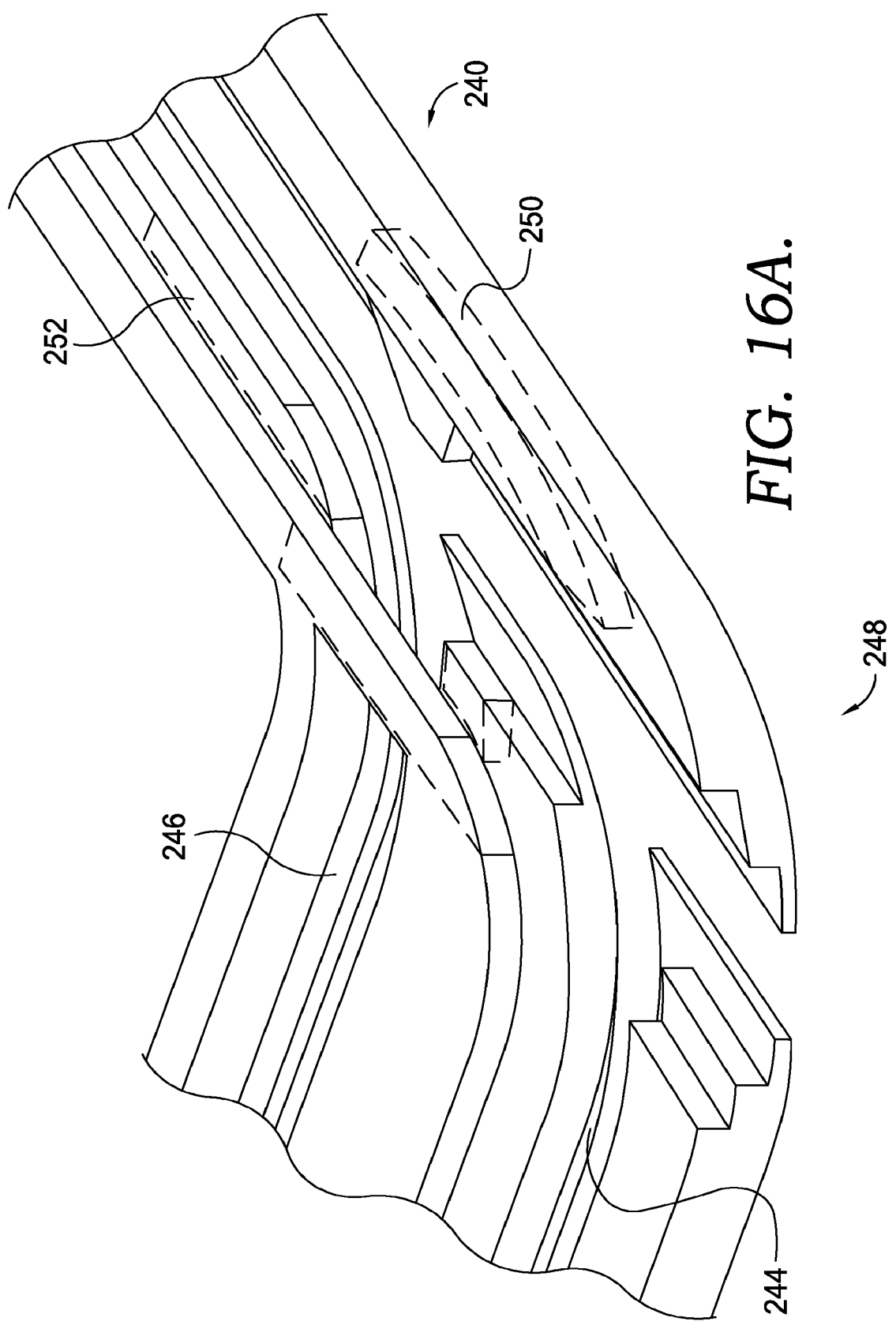
FIG. 16A illustrates an enlarged view of the encircled portion 16A of FIG. 16, shown with the arms retracted.

As seen in FIG. 16A, in some aspects, the first rail frame 240 also includes an exit corner 248. At the exit corner 248, the first track 244 includes a retractable arm 250, and the second track 246 includes a retractable arm 252. When the arm 250 is extended, the first track 244 forms a continuous loop, as depicted in FIG. 16. Similarly, when the arm 252 is extended, the second track 246 forms a continuous loop, as depicted in FIG. 16. When the arm 250 is retracted, and the arm 252 is retracted, an opening exists within the first track 244 and the second track 246, respectively, as depicted in FIG. 16A (the importance of which is described below). Any of a number of mechanisms may be used to extend and retract the arm 250 and the arm 252. Similarly, the second rail frame 242 may include a similar exit corner 254. Additionally, the second rail frame 242 also includes the first track 244 and the second track 246, with the second rail frame 242 being inverted with respect to the first rail frame 240 (with the exception that the exit corner 248 and the exit corner 254 being in similar locations).

Figure 19:
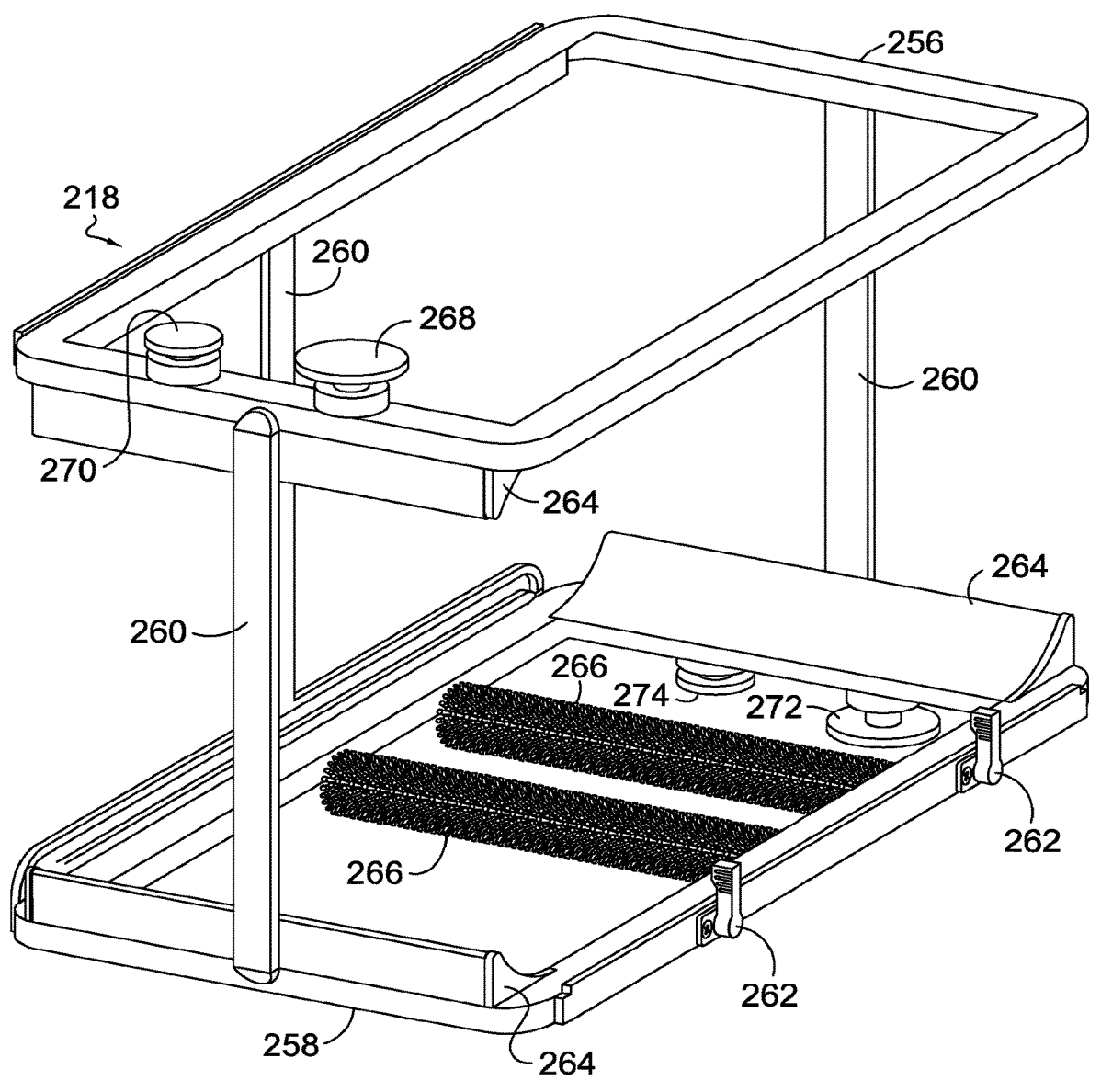
FIG. 19 illustrates a perspective view of one aspect of a container harness for a parcel container for use within the system of FIG. 1.
Figure 20:
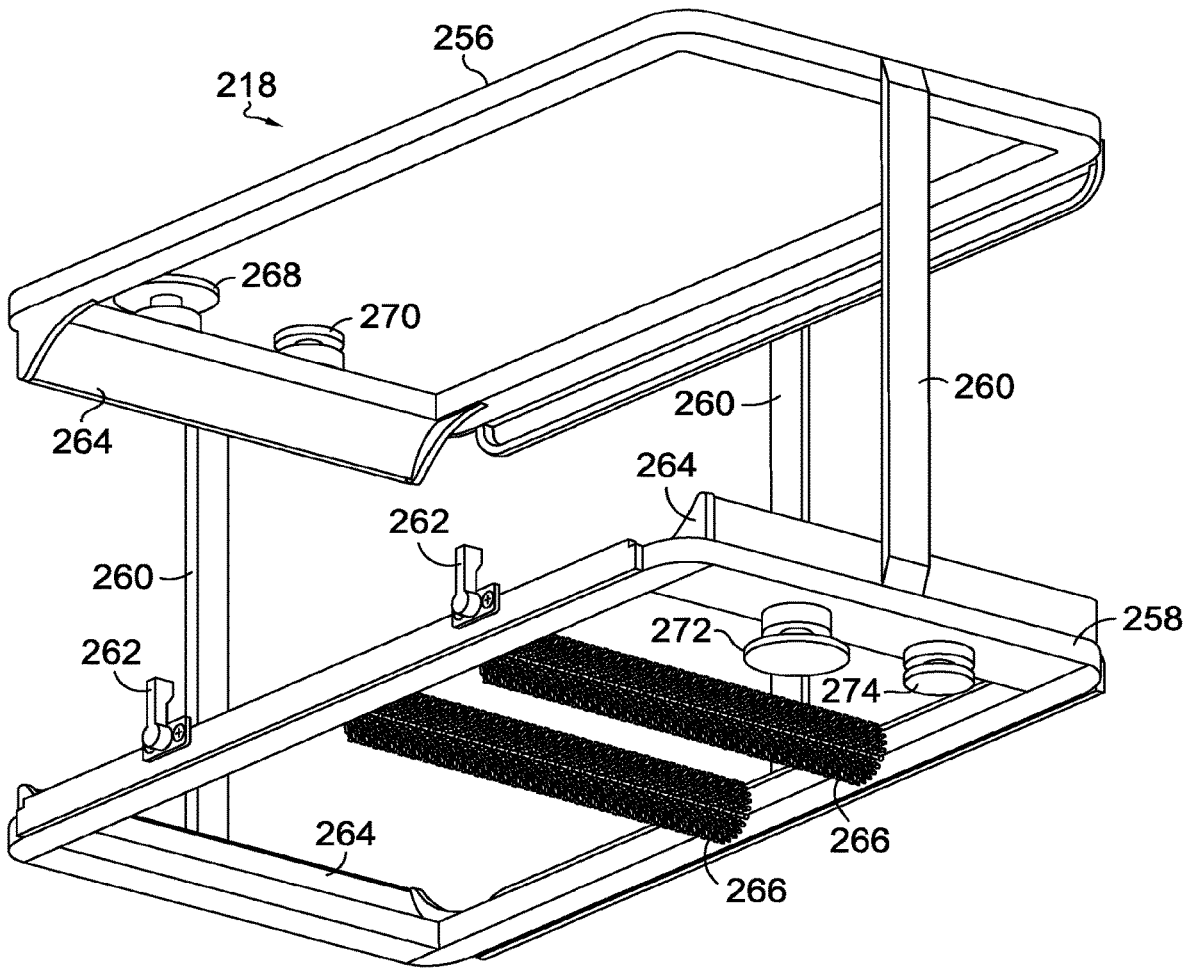
FIG. 20 illustrates a different perspective view of the container harness of FIG. 19.

Each set of rails, such as the first set of rails 234, supports and directs a container harness 218, which in turn supports a respective parcel container 100. The container harness 218 differs in some aspects from the container harness 222 of FIG. 13. As best seen in FIGS. 19 and 20, the container harness 218 includes a generally rectangular rigid upper frame 256 spaced from a generally rectangular rigid lower frame 258. The upper frame 256 is coupled to the lower frame 258 with a number of vertical support members 260. The volume formed by the lower frame 258, the upper frame 256 and the support members 260 is slightly larger than the parcel container 100, such that the parcel container 100 can be received within the volume formed by the lower frame 258, the upper frame 256 and the support members 260. In some aspects, a pair of clamps 262 are coupled to the lower frame 258 that are moveable to a first position to allow a parcel container 100 to be received within the container harness 218, and to a second position to retain the parcel container 100 within the container harness 218. In some aspects, the container harness 218 includes a number of panel guides 264 that have a curved surface facing inward on the container harness 218. The curved surface of the panel guides 264 provides additional support for the first panel 106 and/or the second panel 108 of the parcel container 100. Additionally, the lower frame 258 of the container harness 218 may, in some aspects, include a pair of rollers 266 that are rotatably coupled to the lower frame 258. The rollers 266 function to slow the descent of a parcel 102 released from the parcel container 100 within the container harness 218. In some aspects, the rollers 266 are independently moveable along the lower frame 258, such that they mirror the movement of the first panel 106 and the second panel 108, matching any opening provided by the first panel 106 and the second panel 108 (and thus corresponding to the parcel 102 released from the parcel container 100). As best seen in FIG. 19, a first upper pin 268 and a second upper pin 270 are coupled to the upper frame 256, and extend upwardly from the upper frame 256. In some aspects, the first upper pin 268 has a larger diameter at the top than the top of the second upper pin 270. Similarly, as best seen in FIG. 20, a first lower pin 272 and a second lower pin 274 are coupled to the lower frame 258, and extend downwardly from the lower frame 258. In some aspects, the first lower pin 272 has a larger diameter at the bottom than the bottom of the second lower pin 274.

Figure 21:
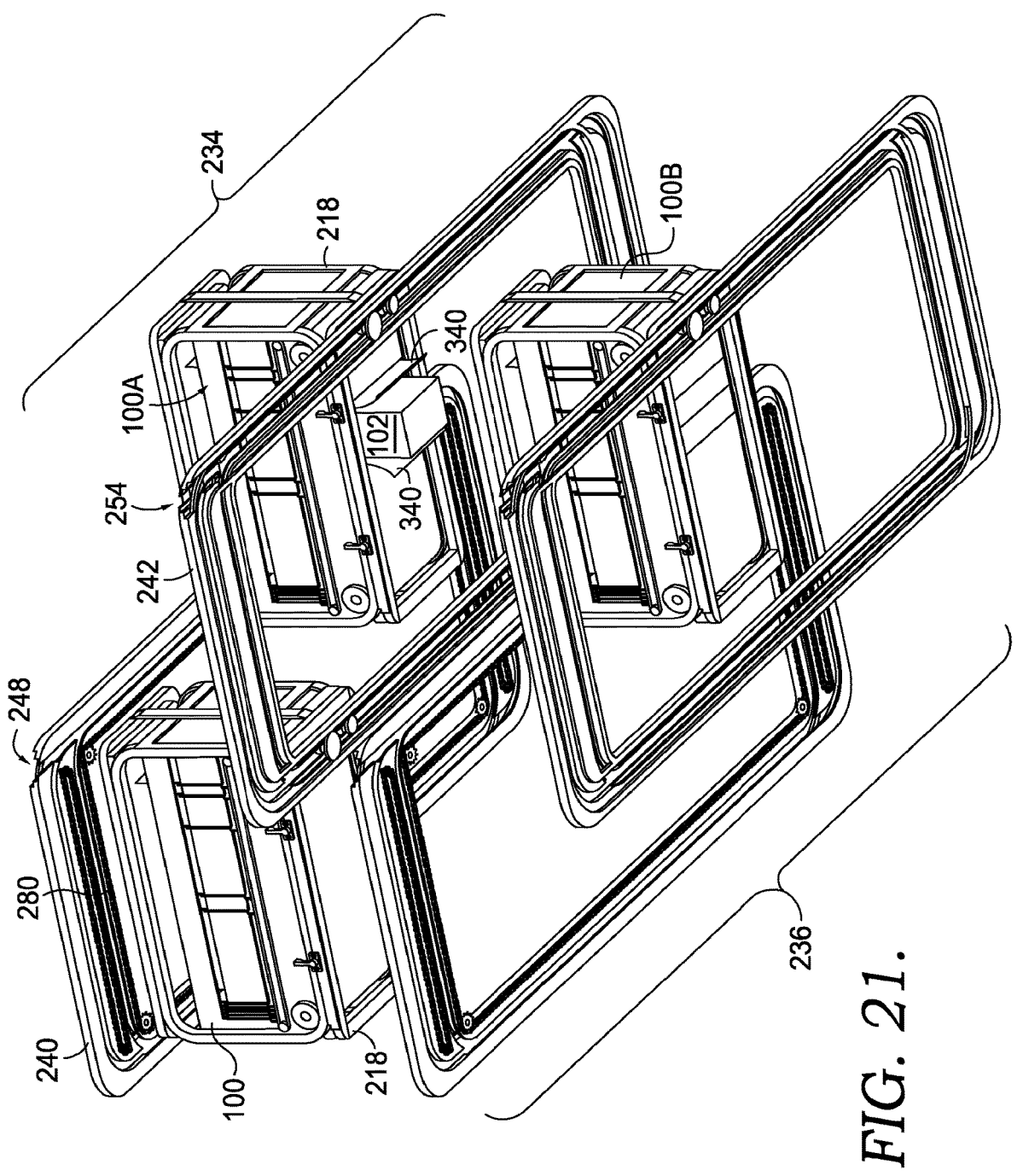
FIG. 21 illustrates a perspective view of one layer of the multi-layered rail system of FIG. 1, with only three parcel containers shown for clarity.
Figure 22:
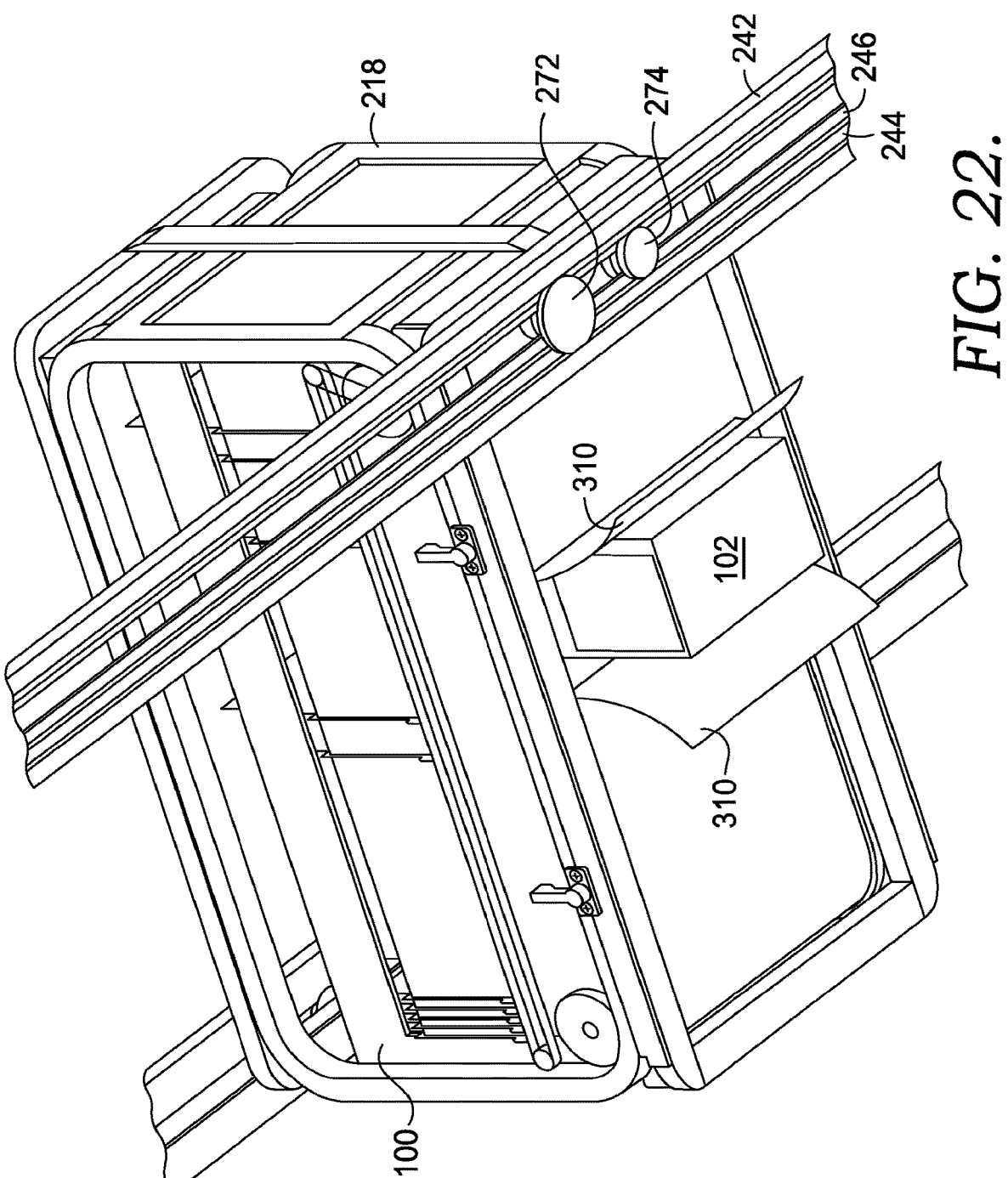
FIG. 22 illustrates an enlarged view of a portion of FIG. 21.

FIG. 21 depicts three parcel containers 100 loaded into three container harnesses 218, and placed within a set of rails (depicted are the first set of rails 234 and the second set of rails 236). In one aspect, the first upper pin 268 and the second upper pin 270 are routed through exit corner 248 (with the arm 250 and the arm 252 retracted), such that the first upper pin 268 enters the first track 244 of the first rail frame 240 and the second upper pin 270 enters the second track 246 of the first rail frame 240). At the same time, the first lower pin 272 and the second lower pin 274 are routed through exit corner 254 (with the arm 250 and the arm 252 retracted), such that the first lower pin 272 enters the first track 244 of the second rail frame 242 and the second lower pin 274 enters the second track 246 of the second rail frame 242). After loading the container harness 218 onto the set of rails, the arm 250 and the arm 252 may be extended, to maintain the container harness 218 and the parcel container 100 within the first track 244 and the second track 246. With the arm 250 and the arm 252 extended, the first set of rails 234 forms a first parcel container route, the second set of rails 236 forms a second parcel container route, and the third set of rails 238 forms a third parcel container route. Each of the first parcel container route, the second parcel container route and the third parcel container route are vertically aligned.

The parcel containers 100 are driven around a respective parcel container route with a drive system 280 that interacts with the respective container harness 218, as seen in FIG. 21. In some aspects, the drive system 280 may include a motor driven chain that drives tabs spaced along the chain to interact with the first upper pin 268 and/or the second upper pin 270. Other drive mechanisms could also be used to move the container harnesses 218 and parcel containers 100 within the respective set of rails, such as, for example, a timing belt drive, a linear motor drive, a belt or chain drive with an electromagnetic clutch. In some aspects, the first set of rails 234, the second set of rails 236 and the third set of rails 238 each have an independent drive system 280. In other aspects, the first set of rails 234, the second set of rails 236 and the third set of rails 238 have a common drive system 280 that can independently move parcel containers 100 within a respective set of rails.

Figure 15:
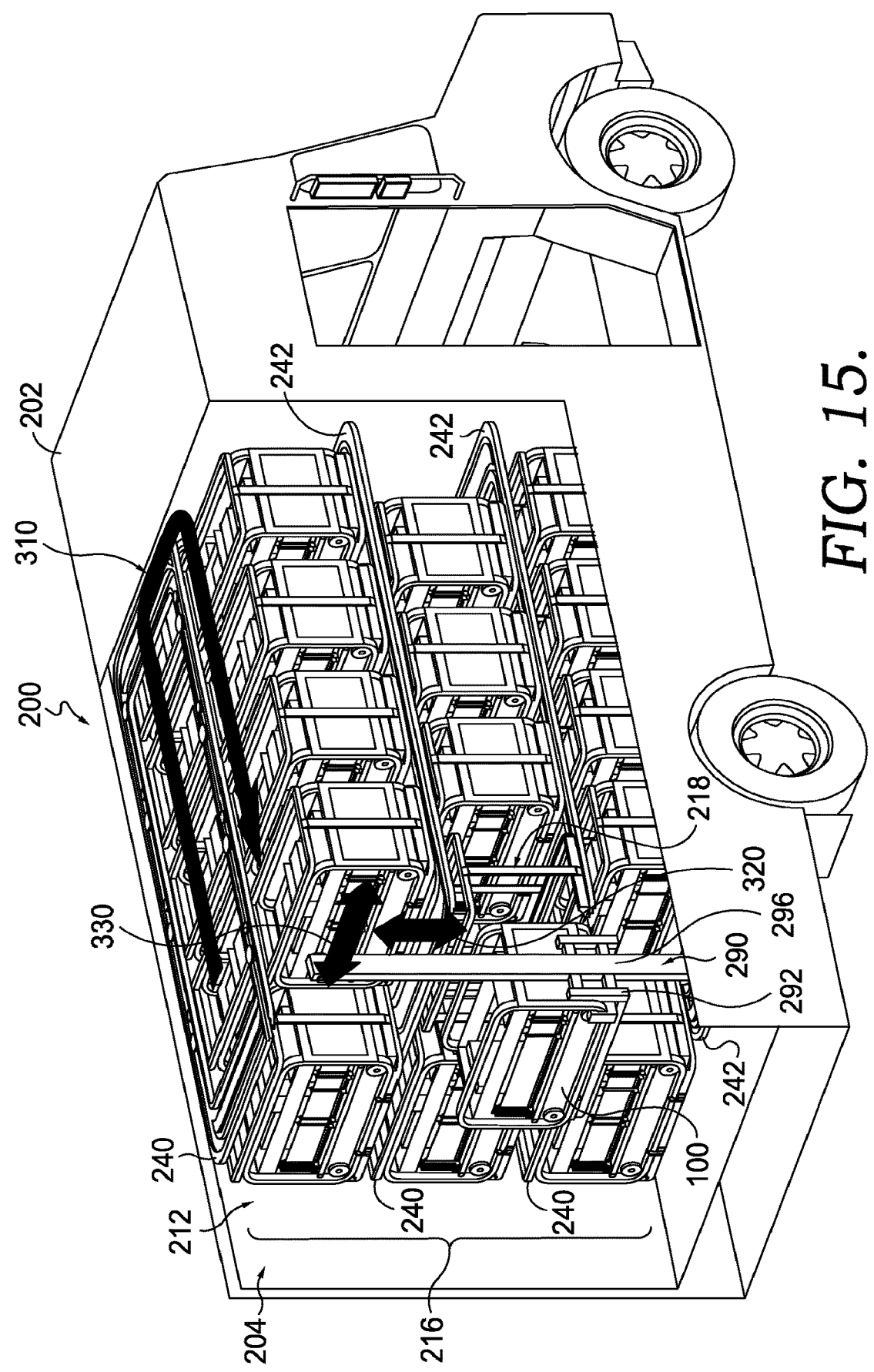
FIG. 15 illustrates the system of FIG. 1, showing the lift and the movement of parcel containers.
Figure 23:
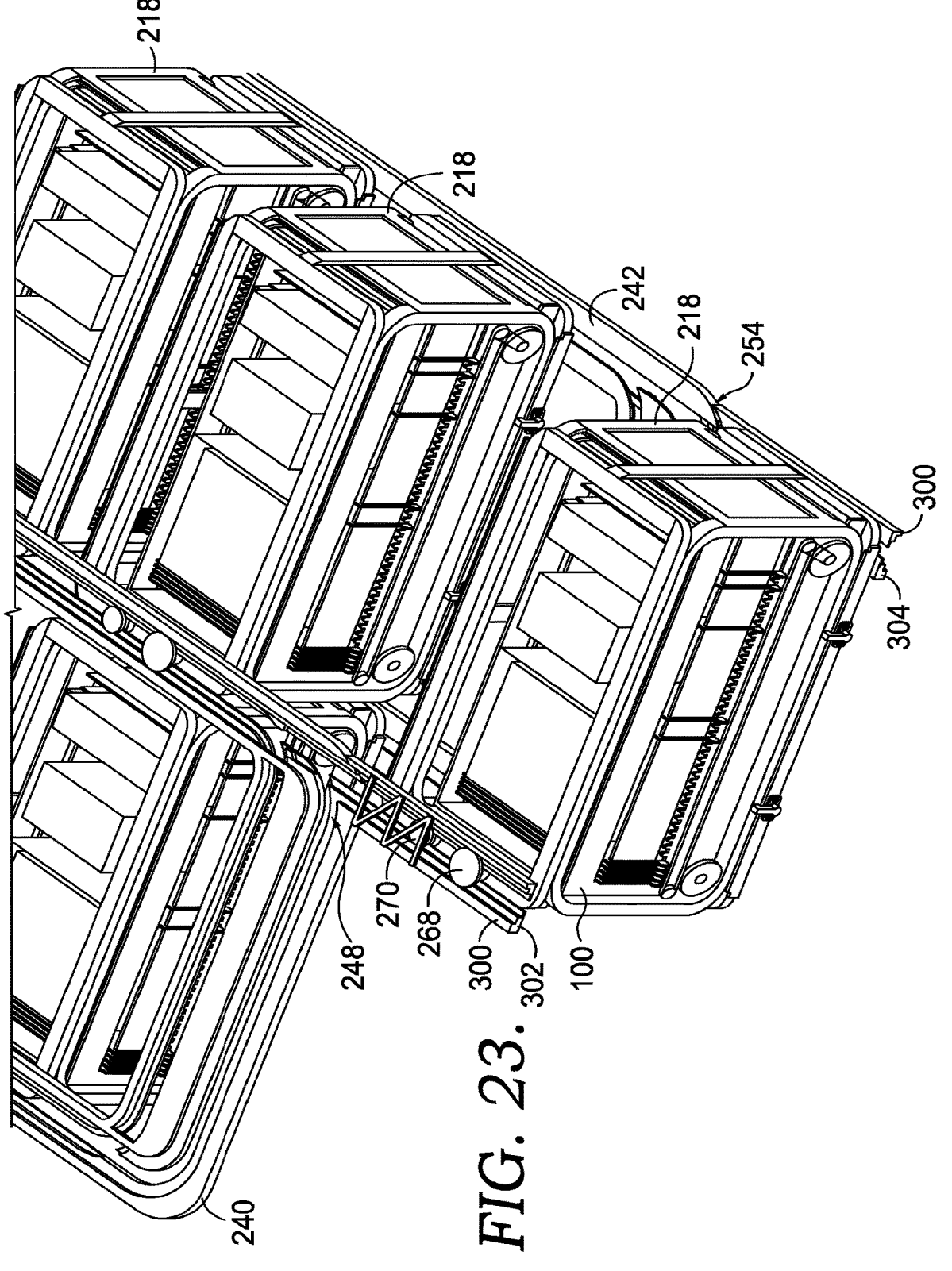
FIG. 23 illustrates a partial perspective view of one layer of the system of FIG. 1, showing the transfer of a parcel container onto rail extensions beyond the parcel container route.
Figure 24:
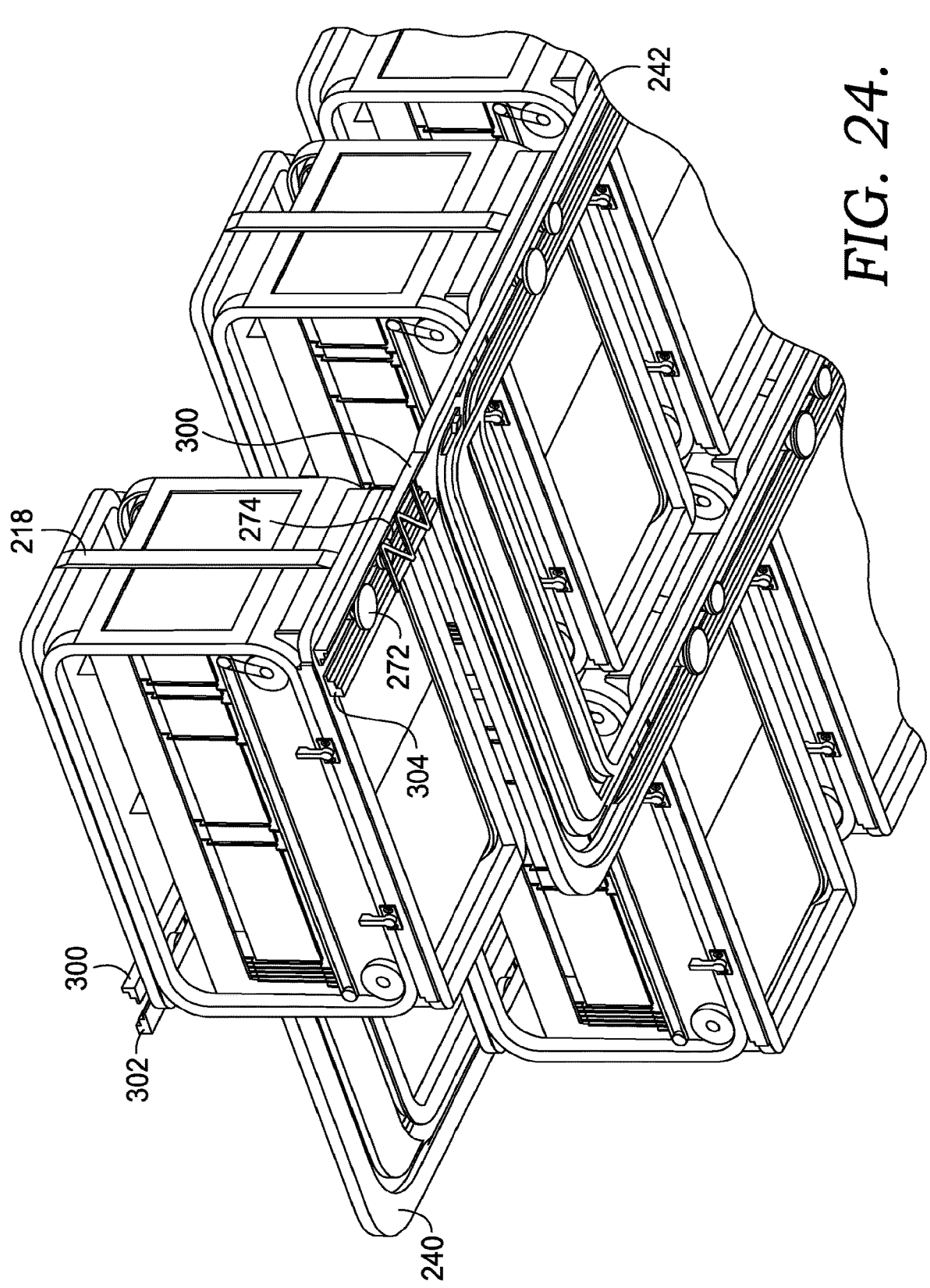
FIG. 24 illustrates a view similar to FIG. 23, but from a different perspective.
Figure 25:
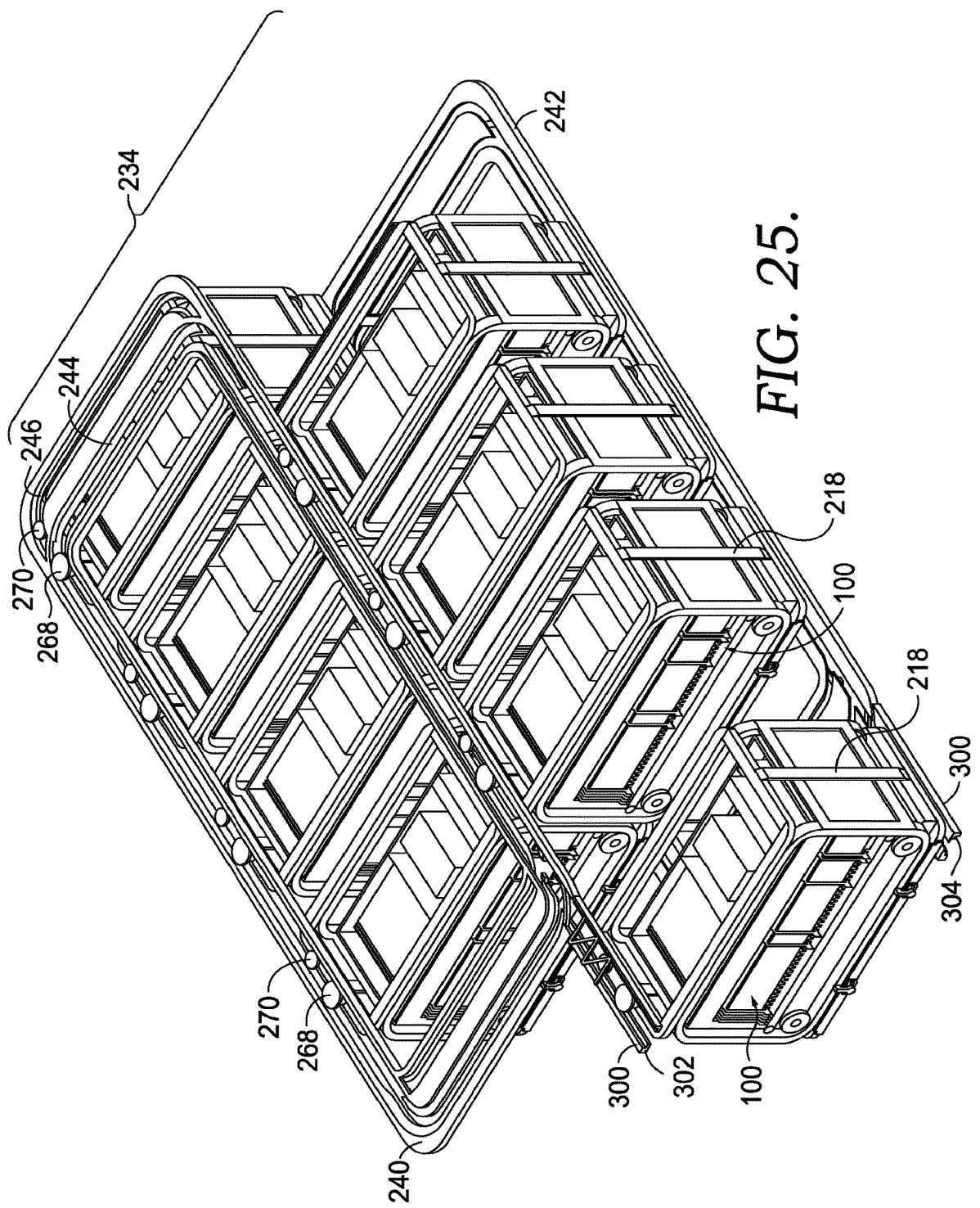
FIG. 25 illustrates a perspective view of one layer with the rail extensions of FIGS. 23-24.

In addition to the drive system 280, the system 200, in some aspects, includes a lift 290 as shown in FIG. 15. The lift 290 may be located in the rear portion 212 of the storage vehicle, and may include a harness bracket 292 that supports the container harness 218, and a lift mechanism that includes a vertical support beam 296 and a motor or other drive mechanism to move the harness bracket 292 (and thus a container harness 218 on the harness bracket 292) up and down the vertical support beam 296. Utilizing the lift 290, a container harness 218 and a parcel container 100 may be moved from one of the first set of rails 234, the second set of rails 236 or the third set of rails 238, to another set of rails. To further aid in the transfer of a container harness 218 from one set of rails to another, a set of rail extensions 300 (as best seen in FIGS. 23-25) may be implemented as a part of the lift 290. The set of rail extensions 300 may include an upper rail extension 302 and a lower rail extension 304. In use, the lift mechanism can position the upper rail extension 302 adjacent and aligned with exit corner 248, and can position the lower rail extension 304 adjacent and aligned with the exit corner 254. With the arm 250 and the arm 252 retracted, a parcel container 100 within the container harness 218 can be moved from the rail extensions 300 into the adjacent first set of rails 234, second set of rails 236 or third set of rails 238.

As shown by the arrow 310 in FIG. 15, the drive system 280 can move parcel containers 100 and container harnesses 218 around a respective parcel container route defined by one of the first set of rails 234, the second set of rails 236 and/or the third set of rails 238. Each set of rails, along with the first upper pin 268 and the first lower pin 272 within track 244 and the second upper pin 270 and the second lower pin 274 within track 246, maintains the orientation of the parcel container 100 as it travels the parcel container route. The positioning of the upper pins 268, 270 and the lower pins 272, 274 and the fact that the tracks 244 and 246 are vertically aligned along the sides (as seen in FIG. 18) and are offset at the ends (as seen in FIG. 17) efficiently routes the parcel containers 100 within the storage vessel 204, allowing two parcel containers to pass side by side, with only minimal clearance needed. In other words, the parcel containers 100 and the sets of rails are sized to allow two parcel containers 100 to span from the first side 206 to the second side 208. This positioning and movement, along with the multi-layered system 216, provides efficient utilization of the volume of the storage vessel 204. And, as explained above, the lift 290 can be used to move a parcel container 100 and container harness 218 from one set of rails to another, as schematically shown by the arrow 320 in FIG. 15. Further, as explained above the dividers 136 may be used to position an individual parcel 102 within a parcel container, as schematically indicated by arrow 330 in FIG. 15. Utilizing this system, a parcel container 100 in one set of rails may be positioned directly above a parcel container in the set of rails below. For example, as shown in FIG. 21, a parcel container 100A in the first set of rails 234 can be positioned directly above a parcel container 100B in the second set of rails 236. Once in this position, the parcel container 100A in the first set of rails 234 can be operated to move one or both of the first panel 106 and/or the second panel 108 to create an opening in the bottom face of the parcel container 100A in the first set of rails 234. An individual parcel 102 is then allowed to move, via gravity, from the parcel container 100A in the first set of rails 234 to the parcel container 100B in the second set of rails 236. Once delivered to the parcel container 100B in the second set of rails 236, the dividers 136 may be used to position the parcel 102 within the parcel container 100B. The rollers 266 described above may control the vertical movement of the parcel 102 from one parcel container 100 to another. In another aspect, as shown in FIG. 21, the ends of the first panel 106 and the second panel 108 may be equipped with flaps 340 that control the vertical movement of the parcel 102 from one parcel container to another.

The above-described movement of parcels 102 from one set of rails to another, along with (in some aspects) the movement of parcel containers 100 and container harnesses 218 around a respective parcel container route within one of the first set of rails 234, the second set of rails 236 and the third set of rails 238, and along with the movement (in some aspects), by the lift 290, of a parcel container 100 from one set of rails to another, and along with (in some aspects) the movement of individual parcels 102 within a respective parcel container 100, all allow for an efficient automatic storage and retrieval system for parcels.

Figure 28:
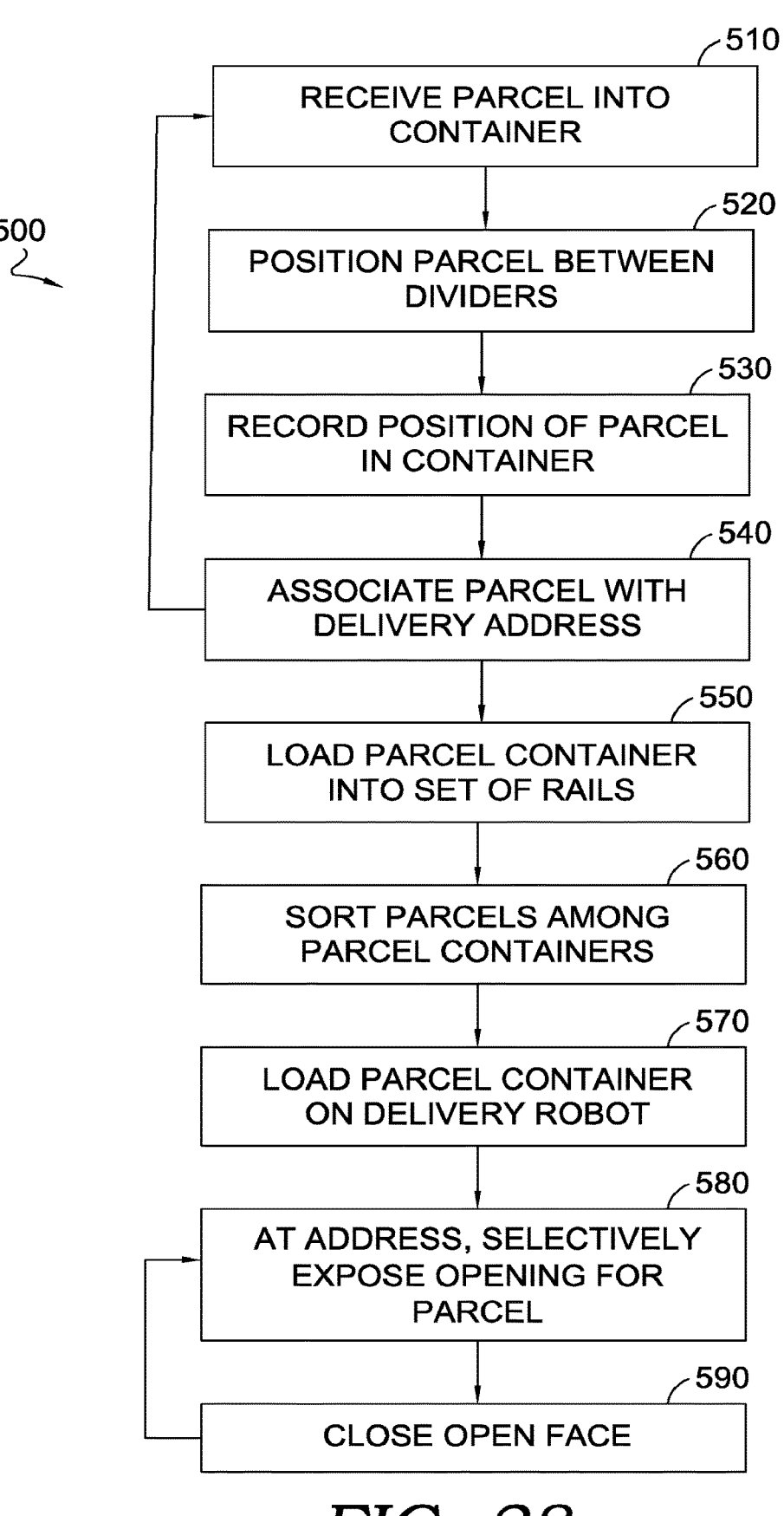
FIG. 28 illustrates an example method that may be performed using the system, in accordance with embodiments described herein.

The parcel container 100 may be used, in some aspects, according to the method 500 shown in FIG. 28. In use, the parcel container 100 can be used within a larger ecosystem as a "smart" container, as the parcel container 100 communicates with the ecosystem for route planning and delivery purposes of the parcels 102 within parcel container 100 (such as by communicating with the overall system 200). As shown in FIG. 28, the method 500 includes receiving a parcel (such as parcel 102) within the parcel container 100, as shown at block 510. At block 510, the parcel 102 being received within the parcel container 100 may be identified to the parcel container 100, such as with a barcode identifier, QR code, or other identifier. The identifier for the parcel 102 may be received by, and stored in, memory 124. The parcel 102 may be manually placed within parcel container 100 by an operator at block 510, or the parcel 102 may be loaded within parcel container 100 in an automated fashion. In some aspects, the parcel container 100 is already received within the container harness 218 at this point. As a parcel 102 is received within the parcel container 100, the method continues by positioning the parcel 102 between dividers 136, as shown at block 520. To position the parcel 102 between dividers 136, the parcel 102 may be placed between a divider 136 already in place, such as divider 136D in FIG. 4, and the next stored, unused divider 136 on an end of the parcel container 100, such as divider 136E in FIG. 4. The divider movement mechanism 140 may then be signaled to move divider 136E, to sweep the parcel (such as parcel 102D in FIG. 4) such that it is sandwiched between divider 136D and divider 136E. Once in this position, the method 200 continues by recording the position of the parcel (such as parcel 102D) within the parcel container 100, as shown at block 530. The position of the parcel 102 is determined, in some aspects, by the position sensing system (such as the position sensing system 160 or the position sensing system 170). In some aspects, if a divider movement mechanism is not provided, the system can determine a slot in the parcel container 100 that is of sufficient size for the parcel (based for example, on the known slot measurements for a parcel container 100). The system can then deposit the respective parcel 102 into the appropriately sized slot and record the position of the parcel. As shown at block 540, the parcel (such as parcel 102D) is associated with a delivery address. The association of the parcel with a delivery address can be done as the parcel 102 is received within the parcel container 100, prior to the parcel 102 being received within the parcel container 100 or after the parcel 102 is received within the parcel container 100. The method 500 may then loop back to block 510, until all the desired parcels 102 have been loaded into the respective parcel container 100, or until the parcel container 100 is at capacity. If the parcel container 100 is not already within one of the first set of rails 234, the second set of rails 236 or the third set of rails 238, the loaded parcel container 100 and container harness 218 may then be placed into one of the first set of rails 234, the second set of rails 236 or the third set of rails 238, using exit corners 248 and 254 (with the arms 250 and 252 retracted), as shown at block 550. Once within the respective set of rails, the drive system 280 can move the parcel container 100 along the parcel container route (within first track 244 and second track 246). The process of loading a parcel container 100 with parcels 102, and placing them within the multi-layered rail system 216 continues until the storage vessel 204 contains a set of parcels 102 estimated for delivery during a shift, or until the multi-layered rail system 216 is at capacity. In some aspects, at least one space is left within each of the first set of rails 234, the second set of rails 236 and the third set of rails 238 to allow parcel containers 100 to be moved from one set of rails to another (such as by lift 290).

During the parcel loading process described above, and/or after the parcel loading process is complete, the system 200 can sort the parcels 102 into respective parcel containers 100 based on the delivery addresses of the parcels 102, such as by grouping parcels 102 within a parcel container 100 based on a defined delivery zone, as shown at block 560. In some aspects, the delivery zone may simply be grouping the parcels 102 together within a parcel container 100 that have delivery addresses close together. Other possible sorting logic may also be implemented by the system 200. The sorting process 560 is possible utilizing one or more of: the drive system 280 (to move parcel containers 100 along a parcel container route and/or to vertically align a parcel container in one set of rails with a parcel container in a vertically adjacent set of rails); the exit corners 248 and 254 along with the lift 290 (to move parcel containers 100 from one set of rails to another set of rails); and the first panel 106 and the second panel 108 (to release a parcel 102 from a parcel container in one set of rails to a parcel container in a vertically aligned and adjacent set of rails). The dividers 136 within the parcel container 100 may also aid in this sorting process. In some aspects, the sorting process 560 is done at a loading location, such as a warehouse, with the vehicle 202 obtaining power from a source at the loading location. In some aspects, the delivery vehicle 202 is an electric vehicle, and completing all, or a majority, of the sorting process 560 at the loading location preserves the battery power of the electric vehicle. It is also contemplated, however, that the sorting process 560 could be conducted while the delivery vehicle is away from the loading location, such as in-route sorting. This could be needed as a desired route changes (such as due to weather, road closures or other events).

Figure 26:
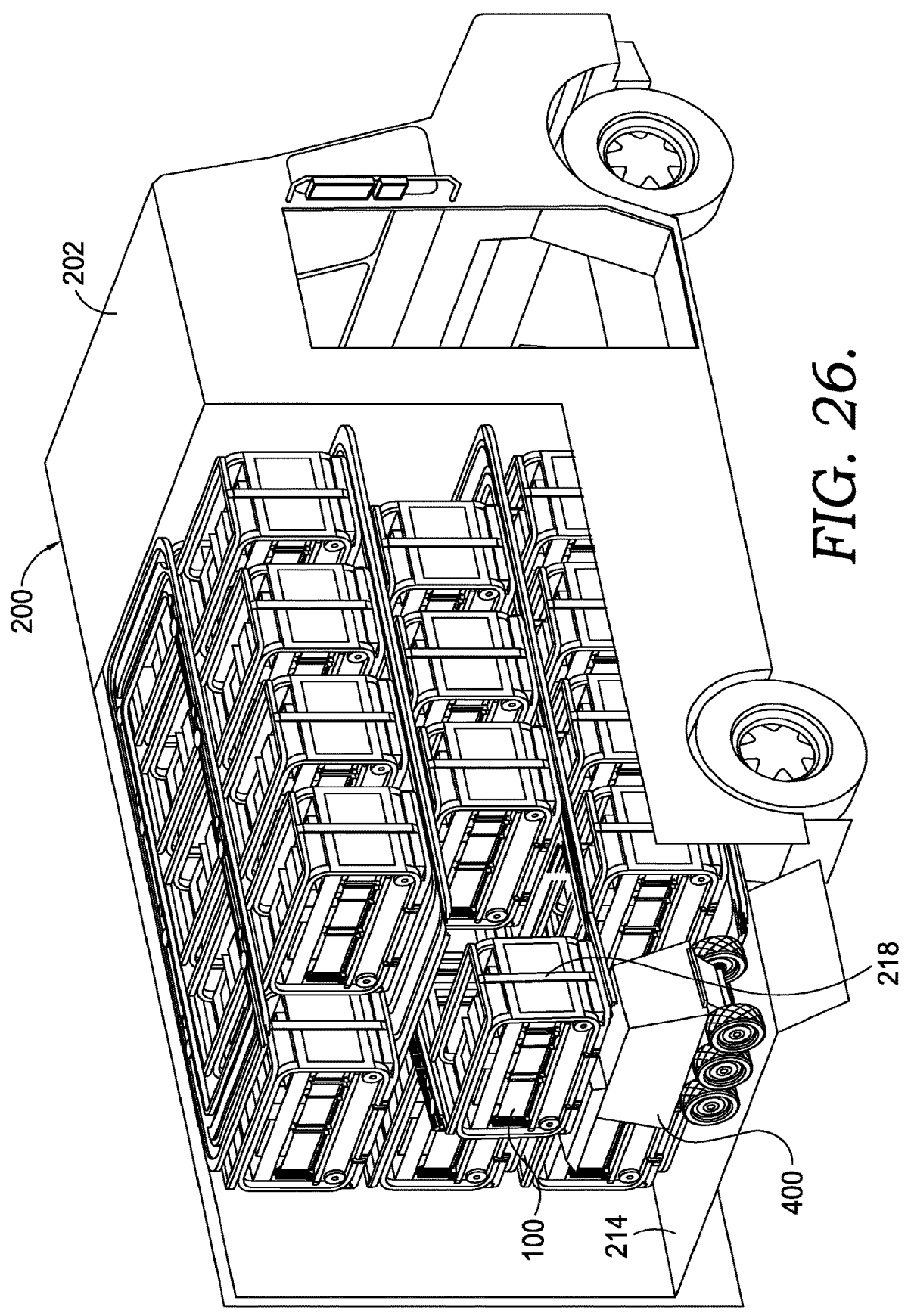
FIG. 26 illustrates a perspective view of one aspect of a transfer of a parcel to a delivery robot.
Figure 27:
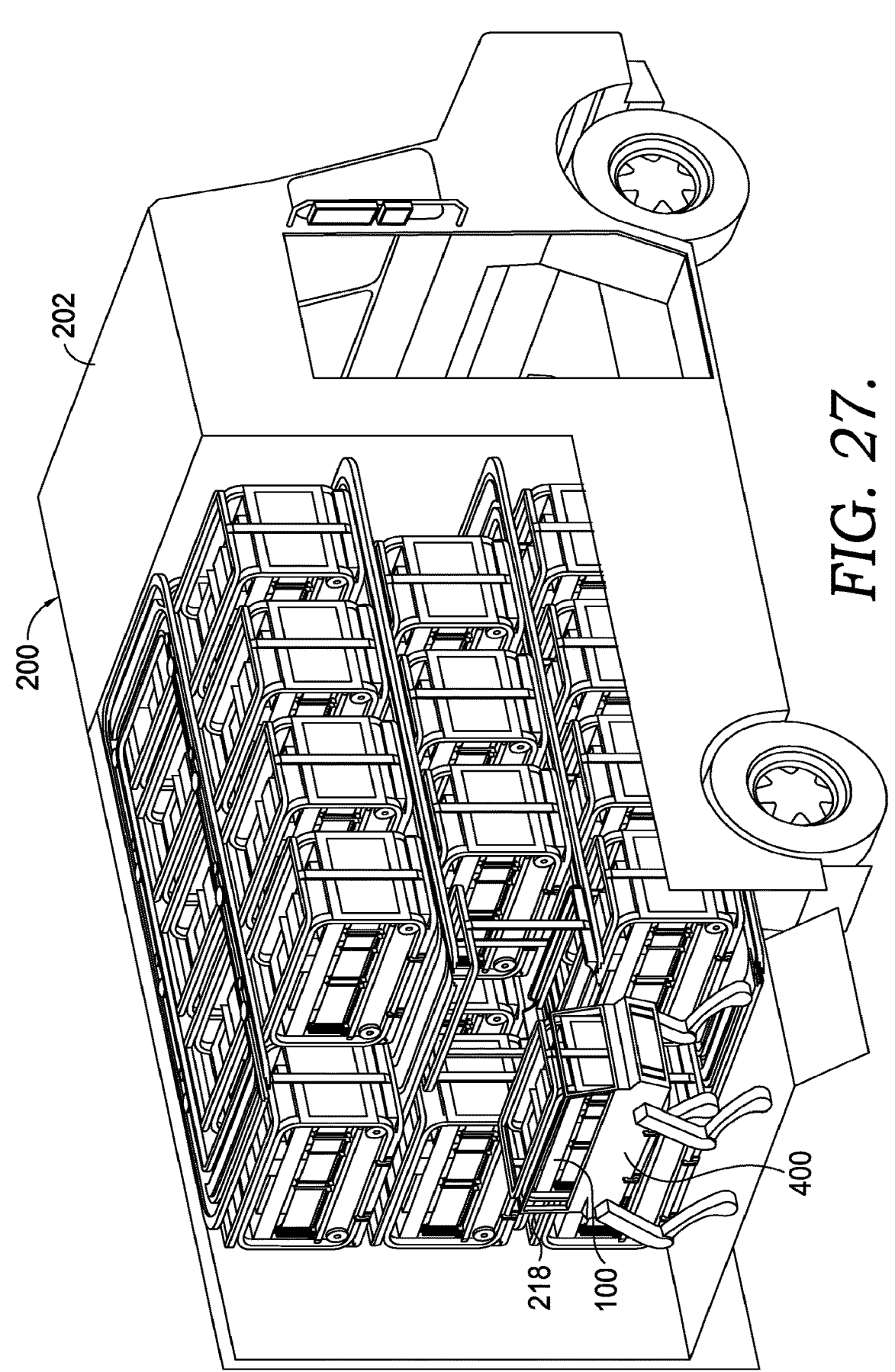
FIG. 27 illustrates a perspective view of another aspect of a transfer of a parcel container to a delivery robot.

In some aspects, at a desired location, such as at or near a delivery zone associated with a parcel container 100, the system 200 may be used to deploy a parcel container 100 (and in some aspects, the container harness 218) onto a delivery robot 400, as shown at block 570 and as seen in FIGS. 26 and 27 (with a single parcel shown loaded into a robot in FIG. 26 and a partially or fully loaded parcel container 100 being shown in FIG. 27). The delivery robots 400 shown in FIGS. 26 and 27 are merely examples of possible delivery robots, and many other robots could be used for the last leg of the delivery process. In some aspects, at block 570, the system 200 transfers only one parcel, or merely several parcels, to the delivery robot 400 (as opposed to an entire parcel container 100). At a delivery location associated with a parcel 102, the delivery robot 400 and/or the parcel container 100 selectively exposes the area of the open face (such as the bottom) of frame 104, as shown at block 580. As best seen in FIG. 2, the first panel 106 and the second panel 108 are moved cooperatively (such as moving the terminal end 114 of first panel 106 in line with the divider 136 forming one side of the compartment associated with the desired parcel, and moving the terminal end 114 of the second panel 108 in line with the divider forming the opposite side of the compartment associate with the desired parcel.) The motors 116 selectively move the first panel 106 and the second panel 108 to the positions needed to release the parcel, informed by the position of the dividers 136 sensed by the position sensing system 160 or the position sensing system 170. As shown in FIGS. 2 and 21, with the gap between the terminal end 114 of the first panel 106 and the terminal end 114 of the second panel 116, the parcel 102 is allowed to exit the parcel container 100 through the open bottom face, such as by gravity. Once the parcel 102 is released from the container, the first panel 106 and the second panel 108 are moved by motors 116 such that the terminal end 114 of the first panel 106 abuts the terminal end 114 of the second panel 108 to effectively close the open bottom face of the frame 104, as shown at block 590. The delivery robot 400 can then return to the vehicle 202 or move to a logical next delivery address associated with a parcel 102 within the parcel container 100 until all the parcels 102 within the parcel container have been delivered. In other aspects, the system 200 can be used without a delivery robot 400, but can selectively present parcels 102 to a driver when at a delivery location.

With regard to various embodiments described in this disclosure, and with reference to the method above, aspects of the present technology may take the form of methods (such as method 500); systems; one or more computer storage media having computer-executable instructions embodied thereon that may be executed by one or more processors (such as CPU 122); or any combination thereof.

Referring back now to FIG. 29, an exemplary operating environment for implementing embodiments of the present invention is shown and designated generally as computing device 2900. Computing device 2900 is but one example of a suitable computing environment and is not intended to suggest any limitation as to the scope of use or functionality of the invention. Neither should the computing device 2900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that performs particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 29:
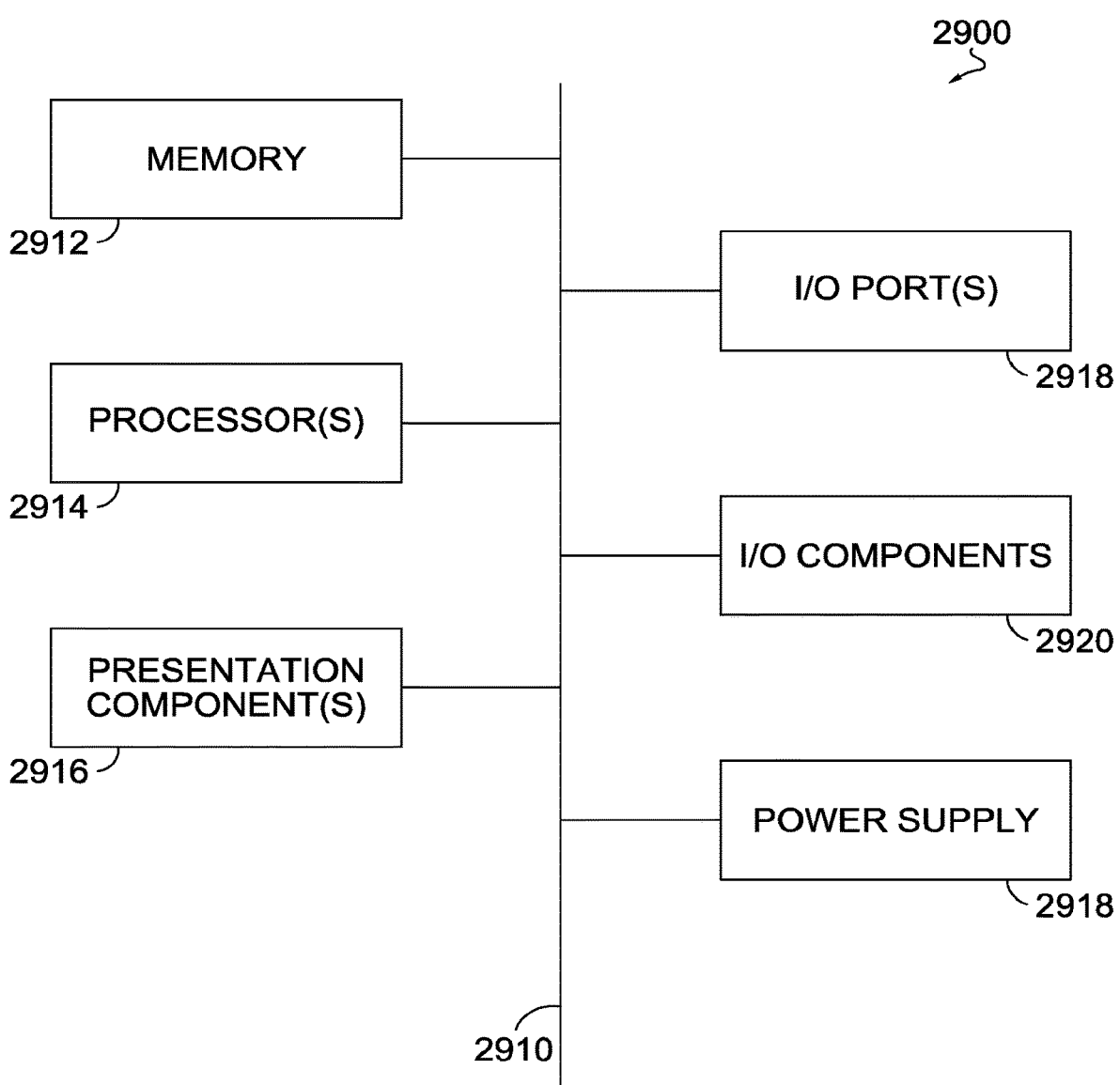
FIG. 29 illustrates an example computing device, in accordance with embodiments described herein.

With reference to FIG. 29, computing device 2900 includes a bus 2910 that directly or indirectly couples the following devices: memory 2912, one or more processors 2914, one or more presentation components 2916, input/output ports 2918, input/output components 2920, and an illustrative power supply 2922. In some aspects, some I/O ports may be linked to wired or wireless communications. The logic for sorting parcels 102 within parcel containers 100, and in operating the drive system 280, the lift 290 and the components of the parcel containers 100, and well as when and which parcel 102 to deliver may reside on the vehicle 202, an external computing unit, a handheld unit, or an in-vehicle computer managing several parcel containers 100 simultaneously. Bus 2910 represents what may be one or more busses (such as an address bus, data bus, or combination thereof). Although the various blocks of FIG. 29 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 29 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 29 and reference to "computing device."

Computing device 2900 typically includes a variety of computer-readable media. Computer-readable media can be any available media that can be accessed by computing device 2900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, random access memory (RAM), read-only memory (ROM), electrically erasable programmable read-only memory (EEPROM), flash memory or other memory technology, Compact Disc Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 2900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 2912 includes computer storage media in the form of volatile and/or nonvolatile memory and may include memory 124. The memory may be removable, non-removable, or a combination thereof. Exemplary hardware devices include solid-state memory, hard drives, optical-disc drives, etc. Computing device 2900 includes one or more processors that read data from various entities such as memory 2912, memory 124 or I/O components 2920. Presentation component(s) 2916 present data indications to a user or other device. Exemplary presentation components include a display device, speaker, printing component, vibrating component, etc.

I/O ports 2918 allow computing device 2900 to be logically coupled to other devices including I/O components 2920, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

Clause 1. A system for the storage and retrieval of parcels, the system comprising: a storage vessel defining an internal volume having a first side, a second side spaced apart from the first side, a front portion extending between the first side and the second side and a rear portion spaced from the front portion and extending between the first side and the second side; a first set of rails defining a first parcel container route within the internal volume; and a first plurality of parcel containers movably coupled to the first set of rails, each parcel container having at least a first side and a second side, an at least partially open top extending between the first side and the second side, and at least one open bottom face opposite the top and extending between the parcel container first side and the parcel container second side, and a plurality of dividers adjustable to define a plurality of adjustable compartments between the parcel container first side and the parcel container second side, each parcel container of the first plurality of parcel containers further having moveable panels that selectively move to cover a portion of the parcel container open bottom face to retain a selected at least one parcel or expose a portion of the parcel container open bottom face to release the selected at least one parcel.

Clause 2. The system of clause 1, further comprising a container harness coupled to each of the parcel containers in the first plurality of parcel containers, and to the first set of rails, the container harness supporting the parcel container and guiding the parcel container within the parcel container route of the first set of rails.

Clause 3. The system of any of clauses 1-2, further comprising: a second set of rails, vertically offset from the first set of rails, the second set of rails defining a second parcel container route within the internal volume, the second parcel container route being vertically aligned with the first parcel container route; and a second plurality of parcel containers movably coupled to the second set of rails, each parcel container of the second plurality of parcel containers having at least a first side and a second side, an at least partially open top extending between the parcel container first side and the parcel container second side, and at least one open bottom face opposite the top and extending between the parcel container first side and the parcel container second side, and a plurality of dividers adjustable to define a plurality of adjustable compartments between the parcel container first side and the parcel container second side, each parcel container further having moveable panels that selectively move to cover a portion of the parcel container open bottom face or expose a portion of the parcel container open bottom face; wherein the first parcel container route and the second parcel container route are configured to vertically align a selected one of the first plurality of parcel containers with a selected one of the second plurality of parcel containers, such that the selected at least one parcel released from the exposed portion of the first parcel container open bottom face is received through the open top of the selected one of the second plurality of parcel containers.

Clause 4. The system of any of clauses 1-3, further comprising a container harness coupled to each of the parcel containers in the second plurality of parcel containers, and to the second set of rails, the container harness supporting a parcel container and guiding the parcel container within the parcel container route of the second set of rails.

Clause 5. The system of any of clauses 1-4, further comprising a first drive system operably coupled between the first set of rails and the first plurality of parcel containers, the first drive system operable to move the parcel containers of the first plurality of parcel containers along the first parcel container route.

Clause 6. The system of any of clauses 1-5, further comprising a second drive system operably coupled between the second set of rails and the second plurality of parcel containers, the second drive system operable to move the parcel containers of the second plurality of parcel containers along the second parcel container route.

Clause 7. The system of any of clauses 1-6, further comprising: a computing device configured to direct the operation of the first drive system and the second drive system to selectively vertically align the selected one of the first plurality of parcel containers with the selected one of the second plurality of parcel containers, the computing device further configured to selectively open the moveable panels on the selected one of the first plurality of parcel containers to allow the selected at least one parcel from selected one of the first plurality of parcel containers to move to the selected one of the second plurality of parcel containers.

Clause 8. The system of any of clauses 1-7, further comprising: a third set of rails, vertically offset from the second set of rails, the third set of rails defining a third parcel container route within the internal volume, the third parcel container route being vertically aligned with the first parcel container route and the second parcel container route; and a third plurality of parcel containers movably coupled to the third set of rails, each parcel container of the third plurality of parcel containers having at least a first side and a second side, an at least partially open top extending between the parcel container first side and the parcel container second side, and at least one open bottom face opposite the top and extending between the parcel container first side and the parcel container second side, and a plurality of dividers adjustable to define a plurality of adjustable compartments between the parcel container first side and the parcel container second side, each parcel container further having moveable panels that selectively move to cover a portion of the parcel container open bottom face or expose a portion of the parcel container open bottom face; the second parcel container route and the third parcel container route are configured to vertically align a selected one of the second plurality of parcel containers with a selected one of the third plurality of parcel containers, such that a selected parcel released from the exposed portion of the second parcel container open bottom face is received through the open top of the selected one of the third plurality of parcel containers.

Clause 9. The system of any of clauses 1-8, further comprising a container harness coupled to each of the parcel containers in the third plurality of parcel containers, and to the third set of rails, the container harness supporting the parcel container of the third plurality of parcel containers and guiding the parcel container within the parcel container route of the third set of rails.

Clause 10. The system of any of clauses 1-9, further comprising a third drive system operably coupled between the third set of rails and the third plurality of parcel containers, the third drive system operable to move the parcel containers of the third plurality of parcel containers along the third parcel container route.

Clause 11. The system of any of clauses 1-10, wherein the first drive system, the second drive system and the third drive system are operably coupled together.

Clause 12. The system of any of clauses 1-11, wherein the computing device is further configured to direct the operation of the second drive system and the third drive system to selectively vertically align a selected one of the second plurality of parcel containers with a selected one of the third plurality of parcel containers, the computing device further configured to selectively open the moveable panels on the selected one of the second plurality of parcel containers to allow a parcel from the selected one of the second plurality of parcel containers to move to the vertically aligned selected one of the third plurality of parcel containers.

Clause 13. The system of any of clauses 1-12, further comprising a lift coupled within the interior volume and configured to receive a parcel container from one of the first set of rails, the second set of rails or the third set of rails and to deliver the received parcel container to another of the first set of rails, the second set of rails or the third set of rails.

Clause 14. The system of any of clauses 1-13, wherein the computing device is further configured to direct the operation of the lift to move a selected parcel container from one of the first set of rails, the second set of rails or the third set of rails to another of the first set of rails, the second set of rails or the third set of rails.

Clause 15. The system of any of clauses 1-14, the lift further comprising a harness bracket and a lift mechanism, the harness bracket having at least a first rail extension selectively connectable to the first set of rails, the second set of rails or the third set of rails to receive the received parcel container and selectively connectable to another of the first set of rails, the second set of rails or the third set of rails to deliver the parcel container, the lift mechanism configured to selectively position and support the received parcel container with the first rail extension vertically adjacent a desired one of the first set of rails, the second set of rails or the third set of rails.

Clause 16. The system of any of clauses 1-15, wherein each of the first set of rails, the second set of rails and the third set of rails comprises: a first rail frame coupled within the interior volume, the first rail frame having a first track and a second track; and a second rail frame coupled within the interior volume having a third track and a fourth track, the second rail frame being vertically offset from the first rail frame by a first distance, and horizontally offset from the first rail frame by a second distance.

Clause 17. The system of any of clauses 1-16, wherein each container harness includes a first upper pin coupled within the first track and a second upper pin coupled within the second track.

Clause 18. The system of any of clauses 1-17, wherein each container harness includes a first lower pin coupled within the third track and a second lower pin coupled within the fourth track.

Clause 19. A system for the storage and retrieval of parcels, the system comprising: a storage vessel defining an internal volume having a first side, a second side spaced apart from the first side, a front portion extending between the first side and the second side and a rear portion spaced from the front portion and extending between the first side and the second side; a multi-layered rail system, with each layer of the rail system having a set of rails defining a parcel container route within the internal volume; a plurality of parcel containers movably coupled to a rail frame on a layer of the multi-layered rail system, each parcel container having at least a first side and a second side, an at least partially open top extending between the parcel container first side and the parcel container second side, and at least one open bottom face opposite the top and extending between the parcel container first side and the parcel container second side, and a plurality of dividers adjustable to define a plurality of adjustable compartments between the parcel container first side and the parcel container second side, each parcel container of the plurality of parcel containers further having moveable panels that selectively move to cover a portion of the parcel container open bottom face to retain at least one parcel or expose a portion of the parcel container open bottom face to release the at least one parcel; and a lift coupled within the interior volume and configured to receive a selected parcel container from one layer of the multi-layered rail system and to deliver the received parcel container to another layer of the multi-layered rail system.

Clause 20. The system of clause 19, further comprising a drive system operably coupled to the multi-layered rail system, the drive system operable to move the parcel containers of the plurality of parcel containers along the parcel container route defined by the set of rails of the layer in which the parcel container is coupled.

Clause 21. The system of any of clauses 19-20, wherein each set of rails of each layer of the multi-layered rail system is configured to allow vertical alignment of a selected parcel container in a first layer with a selected parcel container in a lower, adjacent second layer, such that a selected parcel released from the exposed portion of the parcel container open bottom face in the first layer is received through the open top of the selected parcel container in the second layer.

Clause 22. The system of any of clauses 19-21, further comprising a computing device configured to direct operation of the drive system, the lift and the parcel containers to group parcels within the parcel containers according to delivery zones.

Clause 23. The system of any of clauses 19-22, wherein each set of rails of each layer of the multi-layered rail system maintains the same orientation of each parcel container within the parcel container route as the drive system moves the parcel container along the parcel container route.

Clause 24. The system of any of clauses 19-23, wherein the parcel containers are sized to allow two parcel containers to extend from the first side of the storage vessel to the second side of the storage vessel with the second side of one parcel container adjacent the first side of another parcel container.

Clause 25. The system of any of clauses 19-24, wherein each set of rails of each layer of the multi-layered rail system comprises an upper rail frame and a lower rail frame, wherein the upper rail frame is vertically offset from the first rail frame by a first distance and horizontally offset from the first rail frame by a second distance.

Clause 26. The system of any of clauses 19-25, further comprising a delivery robot configured to transport a selected parcel container, and wherein the computing device is configured to direct the drive system and the lift system to deliver the selected parcel container from the multi-layered rail system to the delivery robot at a desired delivery zone.

Clause 27. The system of any of clauses 19-26, further comprising a delivery robot loading station proximate the rear portion of the interior volume of the storage vessel.

What is claimed is:

1. A system for storage and retrieval of parcels, the system comprising:
a storage vessel defining an internal volume having a first side, a second side spaced apart from the first side, a front portion extending between the first side and the second side and a rear portion spaced from the front portion and extending between the first side and the second side;
a first set of rails defining a first parcel container route within the internal volume; and

a plurality of first parcel containers movably coupled to the first set of rails, each of the plurality of first parcel containers having at least a first parcel container first side and a first parcel container second side, an at least partially open first parcel container top extending between the first parcel container first side and the first parcel container second side, and at least one first parcel container open bottom face opposite the at least partially open first parcel container top and extending between the first parcel container first side and the first parcel container second side, and a plurality of first parcel container dividers adjustable to define a plurality of adjustable first parcel container compartments between the first parcel container first side and the first parcel container second side, each of the plurality of first parcel containers further having moveable first parcel container panels that selectively move, via a motor to cover a portion of the at least one first parcel container open bottom face to retain a selected at least one parcel or expose the portion of the at least one first parcel container open bottom face to release the selected at least one parcel.

2. The system of claim 1, further comprising a first container harness coupled to each of the plurality of first parcel containers, and to the first set of rails, the first container harness supporting each of the plurality of first parcel containers and guiding each of the plurality of first parcel containers within the first parcel container route of the first set of rails.

3. The system of claim 2, further comprising:

a second set of rails, vertically offset from the first set of rails, the second set of rails defining a second parcel container route within the internal volume, the second parcel container route being vertically aligned with the first parcel container route; and a plurality of second parcel containers movably coupled to the second set of rails, each of the plurality of second parcel containers having at least a second parcel container first side and a second parcel container second side, an at least partially open second parcel container top extending between the second parcel container first side and the second parcel container second side, and at least one second parcel container open bottom face opposite the at least partially open second parcel container top and extending between the second parcel container first side and the second parcel container second side, and a plurality of second parcel container dividers adjustable to define a plurality of adjustable second parcel container compartments between the second parcel container first side and the second parcel container second side, each of the plurality of second parcel containers further having moveable second parcel container panels that selectively move to cover a portion of the at least one second parcel container open bottom face or expose the portion of the at least one second parcel container open bottom face;

wherein the first parcel container route and the second parcel container route are configured to vertically align a selected one of the plurality of first parcel containers with a selected one of the plurality of second parcel containers, such that the selected at least one parcel released from the portion of the at least one first parcel container open bottom face is received through the at least partially open second parcel container top of the selected one of the plurality of second parcel containers.

4. The system of claim 3, further comprising a second container harness coupled to each of the plurality of second parcel containers, and to the second set of rails, the second container harness supporting each of the plurality of second parcel containers and guiding each of the plurality of second parcel containers within the second parcel container route of the second set of rails.

5. The system of claim 4, further comprising a first drive system operably coupled between the first set of rails and the plurality of first parcel containers, the first drive system operable to move each of the plurality of first parcel containers along the first parcel container route.

6. The system of claim 5, further comprising a second drive system operably coupled between the second set of rails and the plurality of second parcel containers, the second drive system operable to move each of the plurality of second parcel containers along the second parcel container route.

7. The system of claim 6, further comprising: a computing device configured to direct operation of the first drive system and the second drive system to selectively vertically align the selected one of the plurality of first parcel containers with the selected one of the plurality of second parcel containers, the computing device further configured to selectively open the moveable first parcel container panels on the selected one of the plurality of first parcel containers to allow the selected at least one parcel from selected one of the plurality of first parcel containers to move to the selected one of the plurality of second parcel containers.

8. The system of claim 7, further comprising:

a third set of rails, vertically offset from the second set of rails, the third set of rails defining a third parcel container route within the internal volume, the third parcel container route being vertically aligned with the first parcel container route and the second parcel container route; and a plurality of third parcel containers movably coupled to the third set of rails, each of the plurality of third parcel containers having at least a third parcel container first side and a third parcel container second side, an at least partially open third parcel container top extending between the third parcel container first side and the third parcel container second side, and at least one third parcel container open bottom face opposite the at least partially open third parcel container top and extending between the third parcel container first side and the third parcel container second side, and a plurality of third parcel container dividers adjustable to define a plurality of adjustable third parcel container compartments between the third parcel container first side and the third parcel container second side, each of the plurality of third parcel containers further having moveable third parcel container panels that selectively move to cover a portion of the at least one third parcel container open bottom face or expose the portion of the at least one third parcel container open bottom face;

wherein the second parcel container route and the third parcel container route are configured to vertically align a selected one of the plurality of second parcel containers with a selected one of the plurality of third parcel containers, such that a selected parcel released from the portion of the at least one second parcel container open bottom face is received through the at least partially open third parcel container top of the selected one of the plurality of third parcel containers.

9. The system of claim 8, further comprising a third container harness coupled to each of the plurality of third parcel containers, and to the third set of rails, the third container harness supporting each of the plurality of third parcel containers and guiding each of the plurality of third parcel containers within the third parcel container route of the third set of rails.

10. The system of claim 9, further comprising a third drive system operably coupled between the third set of rails and the plurality of third parcel containers, the third drive system operable to move each of the plurality of third parcel containers along the third parcel container route.

11. The system of claim 10, wherein the first drive system, the second drive system and the third drive system are operably coupled together.

12. The system of claim 11, wherein the computing device is further configured to direct operation of the second drive system and the third drive system to selectively vertically align the selected one of the plurality of second parcel containers with the selected one of the plurality of third parcel containers, the computing device further configured to selectively open the moveable second parcel container panels on the selected one of the plurality of second parcel containers to allow a parcel from the selected one of the plurality of second parcel containers to move to the selected one of the plurality of third parcel containers.

13. The system of claim 12, further comprising a lift coupled within the internal volume and configured to receive at least one of a first parcel container of the plurality of first parcel containers, a second parcel container of the plurality of second parcel containers, or a third parcel container of the plurality of third parcel containers from one of the first set of rails, the second set of rails, or the third set of rails and to deliver the first parcel container, the second parcel container, or the third parcel container to another of the first set of rails, the second set of rails, or the third set of rails.

14. The system of claim 13, wherein the computing device is further configured to direct the operation of the lift to move the first parcel container, the second parcel container, or the third parcel container from one of the first set of rails, the second set of rails, or the third set of rails to another of the first set of rails, the second set of rails, or the third set of rails.

15. The system of claim 14, the lift further comprising a harness bracket and a lift mechanism, the harness bracket having at least a first rail extension selectively connectable to the first set of rails, the second set of rails, or the third set of rails to receive the first parcel container, the second parcel container, or the third parcel container and selectively connectable to another of the first set of rails, the second set of rails, or the third set of rails to deliver the first parcel container the second parcel container, or the third parcel container, the lift mechanism configured to selectively position and support the first parcel container the second parcel container, or the third parcel container with the first rail extension vertically adjacent a desired one of the first set of rails, the second set of rails, or the third set of rails.

16. The system of claim 15, wherein each of the first set of rails, the second set of rails and the third set of rails comprises:
    a first rail frame coupled within the internal volume, the first rail frame having a first track and a second track; and
    a second rail frame coupled within the internal volume having a third track and a fourth track, the second rail frame being vertically offset from the first rail frame by a first distance, and horizontally offset from the first rail frame by a second distance.

17. The system of claim 16, wherein each of the first container harness, the second container harness, and the third container harness includes a first upper pin coupled within the first track and a second upper pin coupled within the second track.

18. The system of claim 17, wherein each of the first container harness, the second container harness, and the third container harness includes a first lower pin coupled within the third track and a second lower pin coupled within the fourth track.

19. A system for the storage and retrieval of parcels, the system comprising:
    a storage vessel defining an internal volume having a first side, a second side spaced apart from the first side, a front portion extending between the first side and the second side and a rear portion spaced from the front portion and extending between the first side and the second side;
    a multi-layered rail system, wherein each layer of the multi-layered rail system comprises a set of rails defining a parcel container route within the internal volume;
    a motor;
    a plurality of parcel containers movably coupled to a rail frame on a layer of the multi-layered rail system, each of the plurality of parcel containers having at least a parcel container first side and a parcel container second side, an at least partially open parcel container top extending between the parcel container first side and the parcel container second side, and at least one parcel container open bottom face opposite the at least partially open parcel container top and extending between the parcel container first side and the parcel container second side, and a plurality of dividers adjustable to define a plurality of adjustable compartments between the parcel container first side and the parcel container second side, each of the plurality of parcel containers further having panels that are selectively movable by the motor to cover a portion of the at least one parcel container open bottom face to retain at least one parcel or expose the portion of the at least one parcel container open bottom face to release the at least one parcel; and
    a lift coupled within the internal volume and configured to receive a selected parcel container from one layer of the multi-layered rail system and to deliver the selected parcel container to another layer of the multi-layered rail system.

20. The system of claim 19, further comprising a drive system operably coupled to the multi-layered rail system, the drive system operable to move each of the plurality of parcel containers along the parcel container route defined by the set of rails of the layer.

21. The system of claim 20, wherein each set of rails of each layer of the multi-layered rail system is configured to allow vertical alignment of a first parcel container selected from the plurality of parcel containers in a first layer with a second parcel container selected from the plurality of parcel containers in a lower, adjacent second layer, such that a selected parcel released from the portion of the at least one parcel container open bottom face of the first parcel container in the first layer is received through the at least partially open parcel container top of the second parcel container in the second layer.

22. The system of claim 21, further comprising a computing device configured to direct operation of the drive system, the lift, and the plurality of parcel containers to group parcels within the plurality of parcel containers according to delivery zones.

23. The system of claim 22, wherein each set of rails of each layer of the multi-layered rail system maintains the same orientation of each of the plurality of parcel containers within the parcel container route as the drive system moves each of the plurality of parcel containers along the parcel container route.

24. The system of claim 23, wherein each of the plurality of parcel containers is sized to allow two parcel containers to extend from the first side of the storage vessel to the second side of the storage vessel with the parcel container second side of a first parcel container of the two parcel containers adjacent the parcel container first side of a second parcel container of the two parcel containers.

25. The system of claim 24, wherein each set of rails of each layer of the multi-layered rail system comprises an upper rail frame and a lower rail frame, wherein the upper rail frame is vertically offset from the rail frame by a first distance and horizontally offset from the first-rail frame by a second distance.

26. The system of claim 25, further comprising a delivery robot configured to transport the selected parcel container, and wherein the computing device is configured to direct the drive system and the lift to deliver the parcel container from the multi-layered rail system to the delivery robot at a desired delivery zone.

27. The system of claim 26, further comprising a delivery robot loading station proximate the rear portion of the internal volume of the storage vessel.

\*  \*  \*  \*  \*